United States Patent [19]
Lefebvre et al.

[11] Patent Number: 5,956,661
[45] Date of Patent: Sep. 21, 1999

[54] TELEMETRIC SPACIAL DATA RECORDER

[75] Inventors: Guy Lefebvre, Québec; Roméo Hudon, Longueuil, both of Canada

[73] Assignee: Lasercad Inc., Anjou, Canada

[21] Appl. No.: 08/971,548

[22] Filed: Nov. 17, 1997

Related U.S. Application Data

[63] Continuation-in-part of application No. 08/731,983, Oct. 23, 1996, abandoned.

[51] Int. Cl.$^6$ ...................................................... G01C 5/00
[52] U.S. Cl. .......................... 702/150; 702/155; 702/159; 356/376
[58] Field of Search ........................... 702/150, 155–159; 356/372, 375, 376, 383, 385, 373; 33/503, 700, 706, 753; 364/474.34–474.37

[56] References Cited

U.S. PATENT DOCUMENTS

| | | | |
|---|---|---|---|
| 4,205,385 | 5/1980 | Erickson et al. . | |
| 4,688,184 | 8/1987 | Taniguti et al. . | |
| 4,703,443 | 10/1987 | Moriyasu . | |
| 4,811,243 | 3/1989 | Racine . | |
| 4,820,041 | 4/1989 | Davidson et al. . | |
| 4,901,253 | 2/1990 | Iwano et al. . | |
| 5,091,869 | 2/1992 | Ingram et al. . | |
| 5,148,377 | 9/1992 | McDonald . | |
| 5,220,536 | 6/1993 | Stringer et al. . | |
| 5,247,487 | 9/1993 | Beliveau et al. . | |
| 5,256,908 | 10/1993 | Averbuch et al. . | |
| 5,337,149 | 8/1994 | Kozah et al. | 357/376 |
| 5,422,861 | 6/1995 | Stringer et al. | 367/99 |
| 5,434,803 | 7/1995 | Yoshida | 702/155 |
| 5,440,492 | 8/1995 | Kozah et al. | 702/150 |
| 5,467,290 | 11/1995 | Darland et al. | 702/150 |
| 5,675,514 | 10/1997 | Lefebvre | 702/150 |

FOREIGN PATENT DOCUMENTS

| | | |
|---|---|---|
| 53-118067 | 10/1978 | Japan . |
| 60-229158 | 11/1985 | Japan . |
| 61-294310 | 12/1986 | Japan . |

OTHER PUBLICATIONS

Gort, Alfred F., Minicomputer and Microprocessors in Optical Systems, vol. 230, 1980, 158–168.

*Primary Examiner*—Kamini Shah
*Attorney, Agent, or Firm*—Goudreau Gage Dubue & Martineau Walker

[57] ABSTRACT

A telemetric spacial data recorder for the elaboration of a floor plan is described herein. The telemetric spacial data recorder includes a base module, a remote module, a hand held module and a data acquisition device. The distances between (a) the base module and the remote module, (b) the remote module and the hand held module and (c) the hand held module and a target point of a physical object are measured by electronic distance measuring devices. Similarly, the angle relations between, (i) the base module and the remote module, (ii) the remote module and the hand held module and (iii) the hand held module and the target point of a physical object are measured by electronic angle measuring devices. The measurement devices are linked to the data acquisition device which makes a geometrical construction to determine the relative spacial position of the target point of the physical surface with respect to the spacial position of the base module. According to another embodiment of the present invention there is provided a telemetric spacial data recorder including a remote module, a displaceable module and a data acquisition device. Again, distances and angles are measured and supplied to the data acquisition device that calculates the relative spacial position of a target point with respect to the remote module.

37 Claims, 13 Drawing Sheets

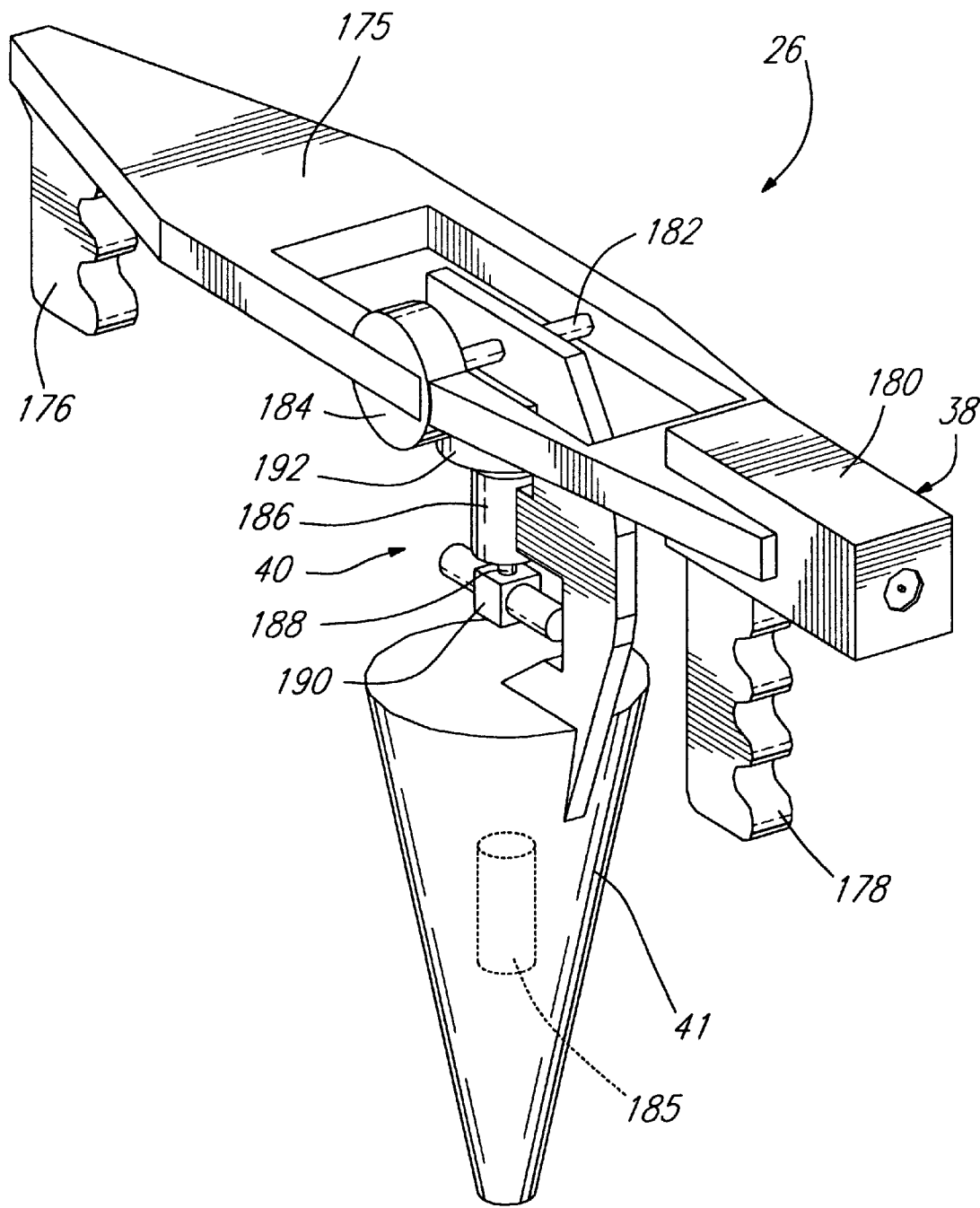

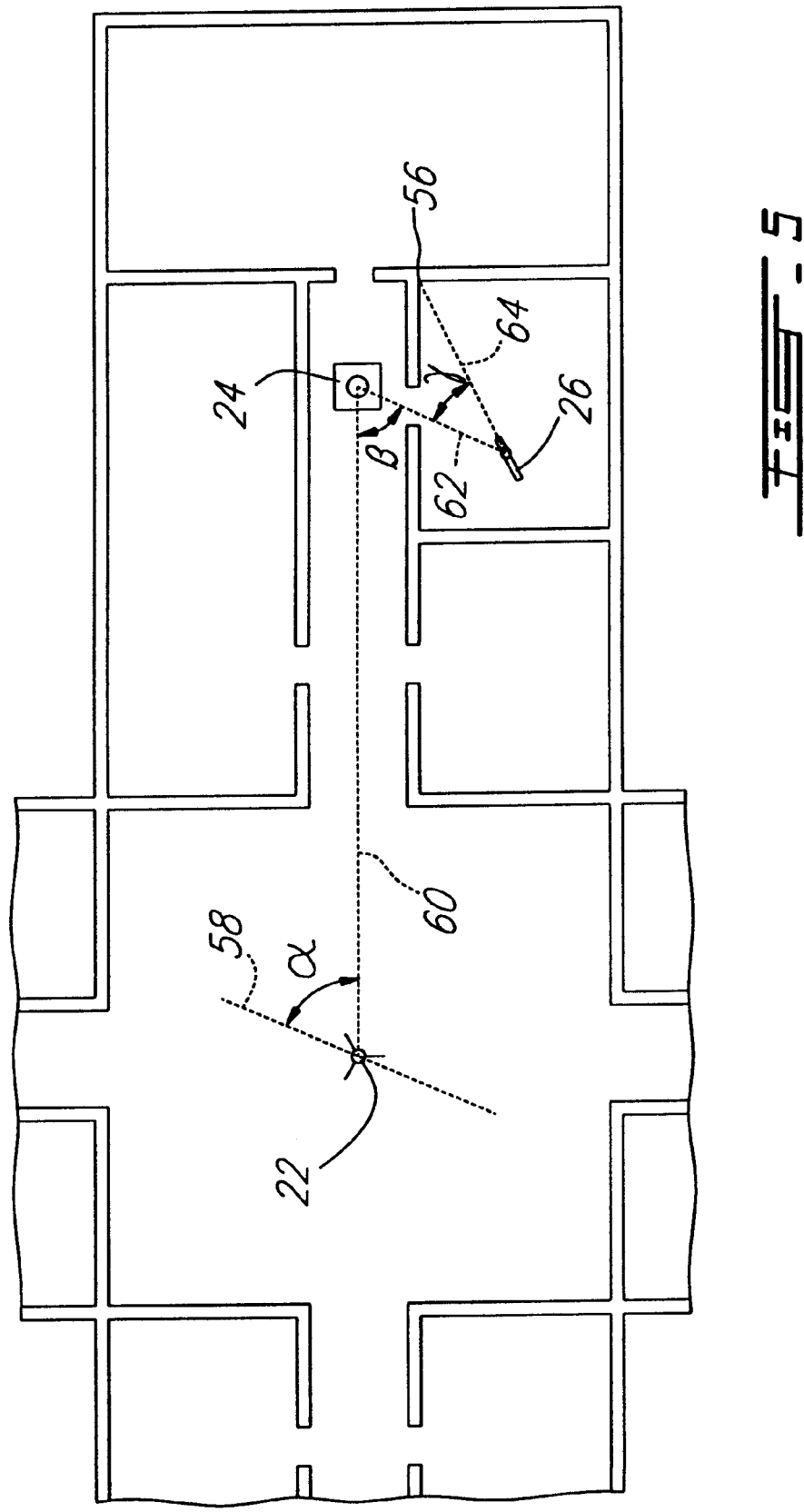

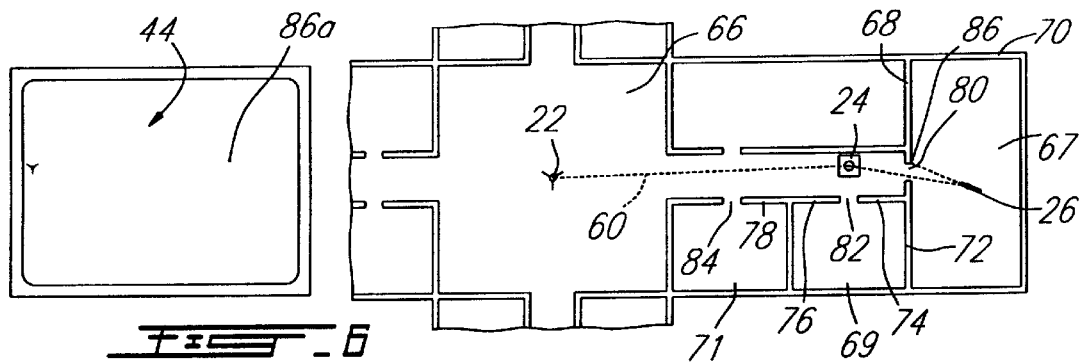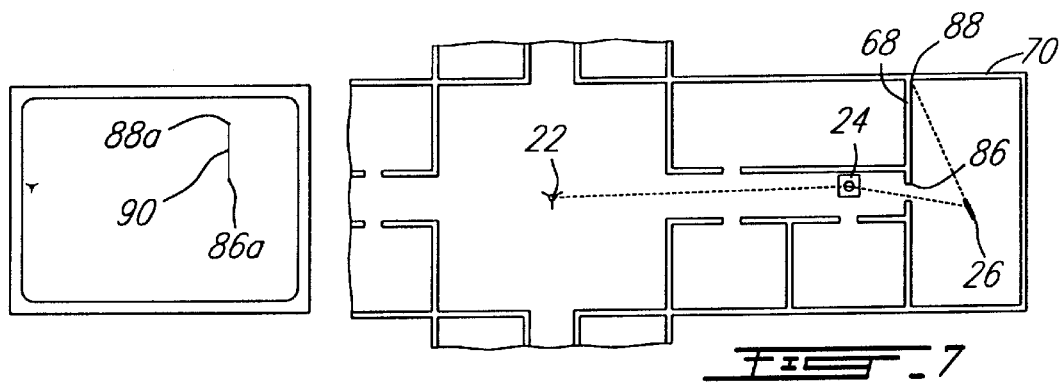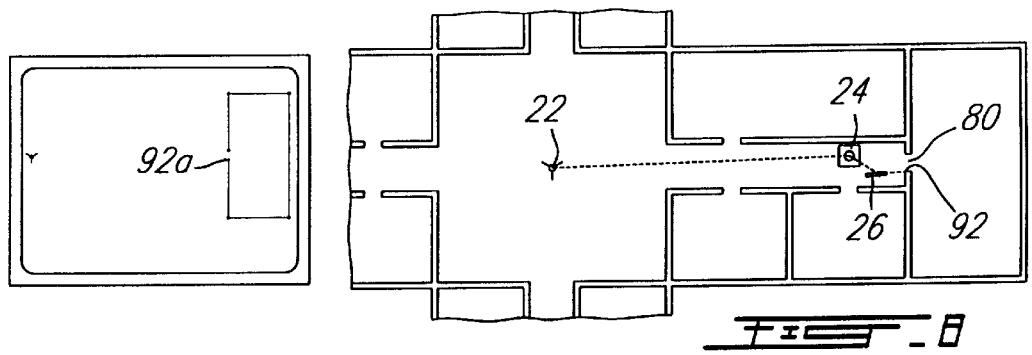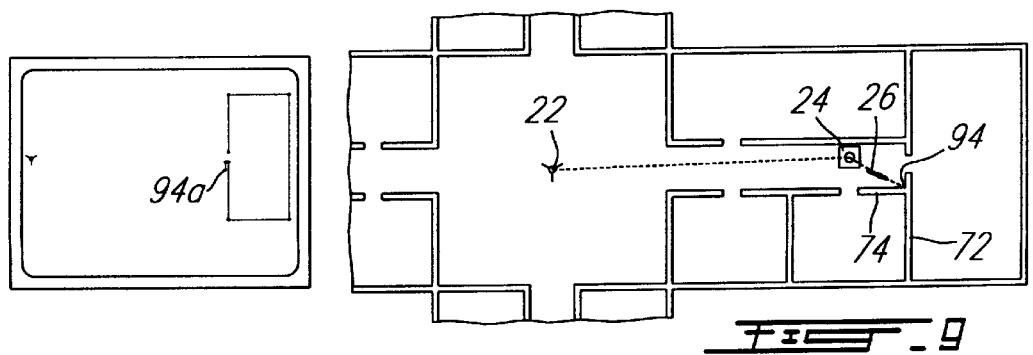

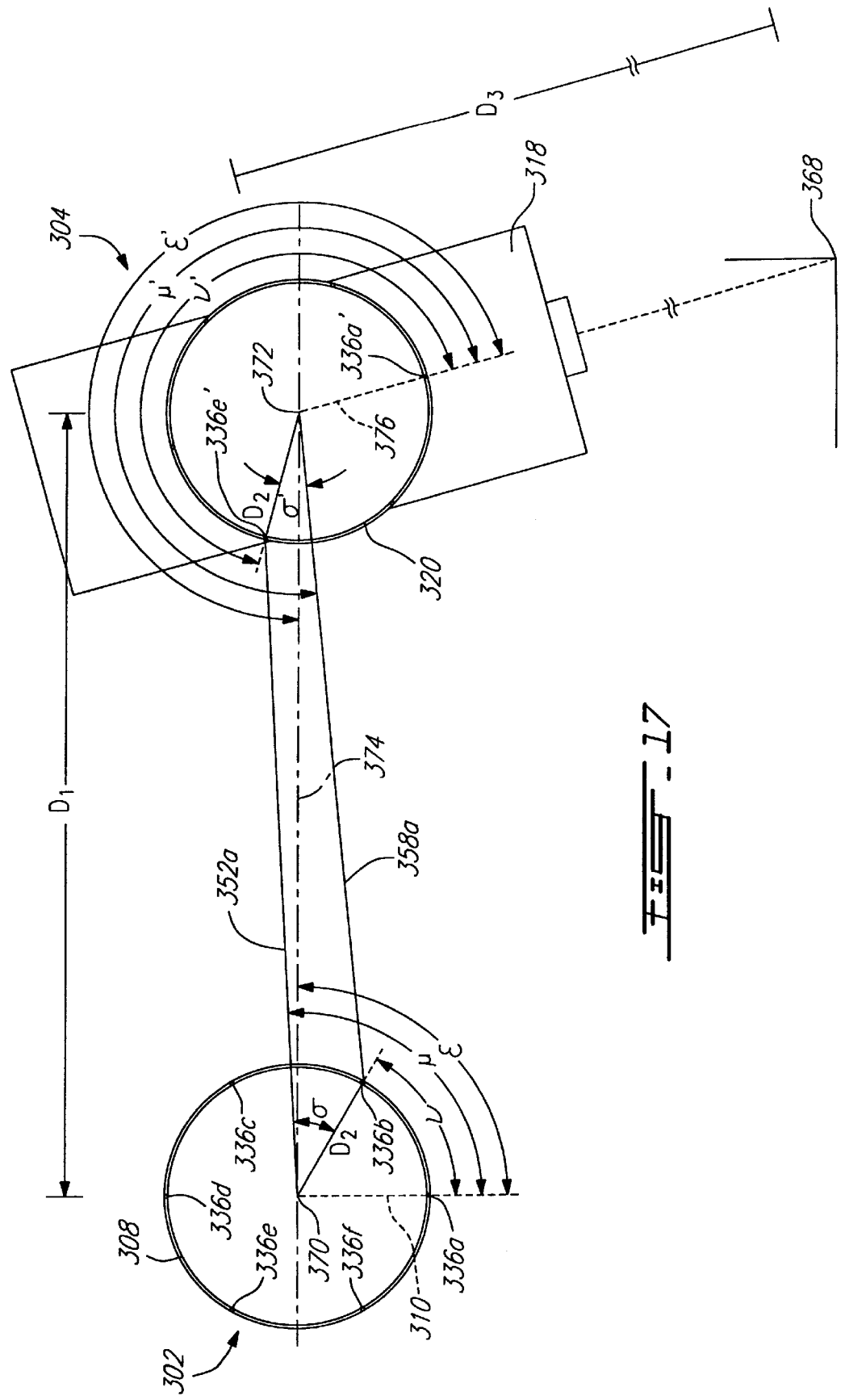

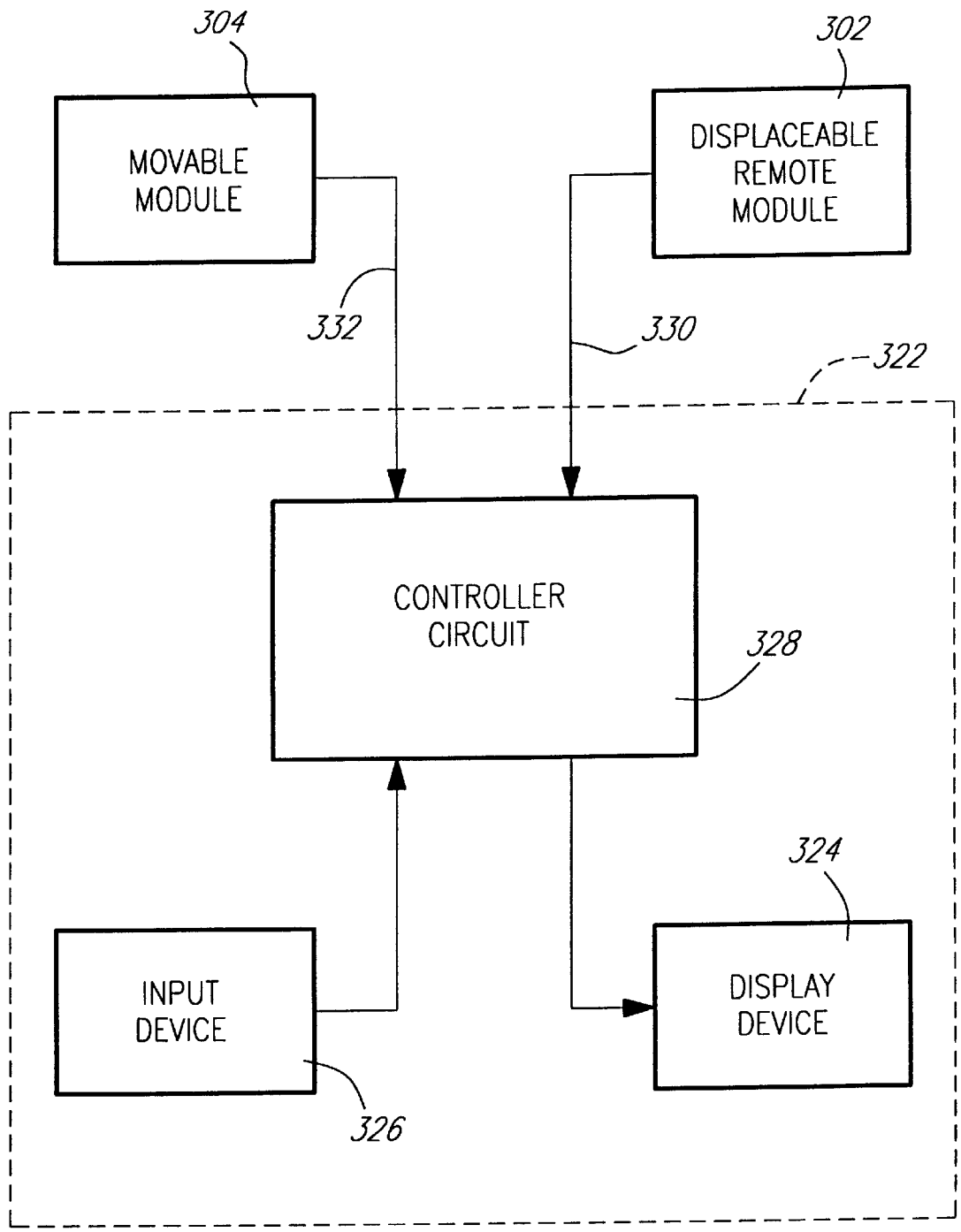

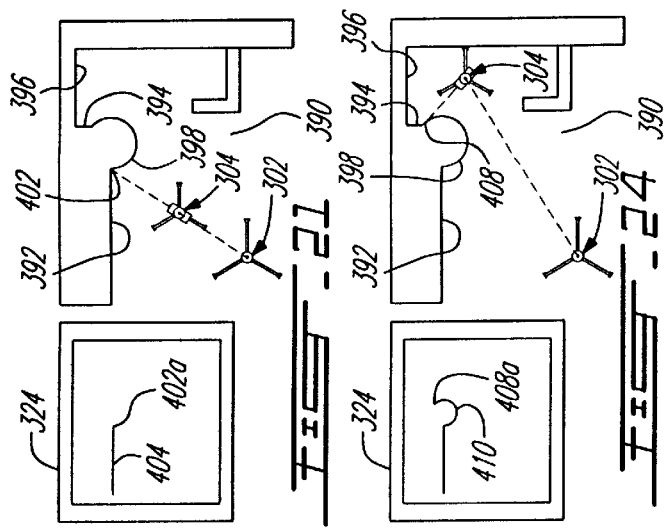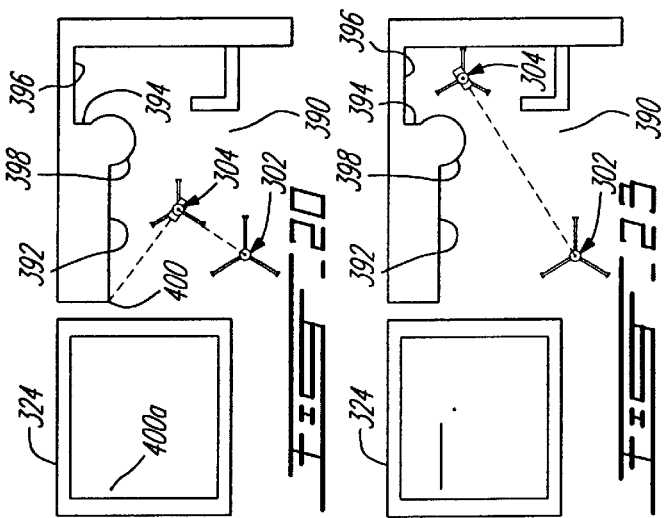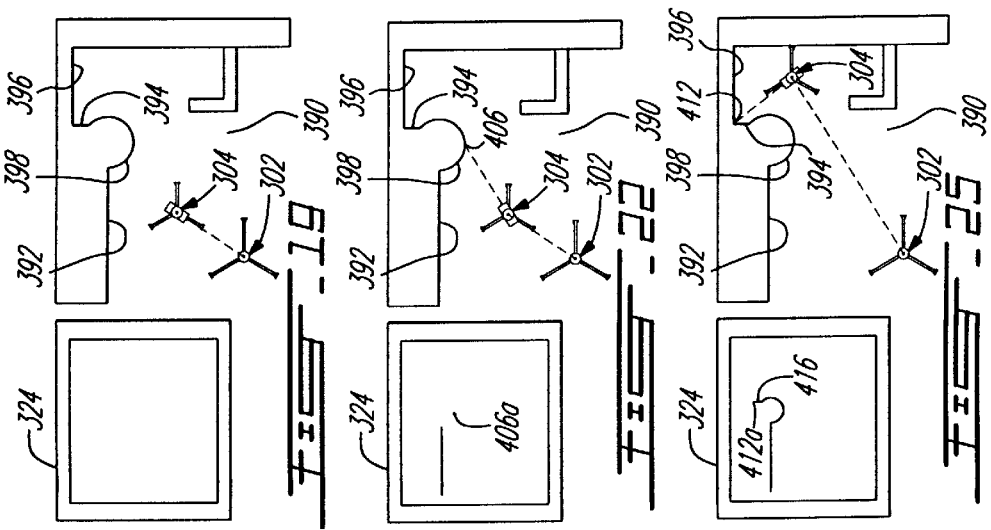

TELEMETRIC SPACIAL DATA RECORDER

RELATED U.S. PATENT APPLICATION

This is a Continuation-In-Part of U.S. patent application Ser. No. 08/731,983 filed on Oct. 23, 1996 for an invention entitled "THREE-MODULE TELEMETRIC SPACIAL DATA RECORDER" now abandoned.

FIELD OF THE INVENTION

The present invention relates to data recorders. More specifically, the present invention relates to a telemetric spacial data recorder which enables the elaboration of a floor plan or the like.

BACKGROUND OF THE INVENTION

The representation of the spacial relationship between coordinate points of objects has been traditionally hand-drawn and displayed on paper plans. The data collected for the elaboration of these plans were generally based on tape and/or optical measurements.

Unfortunately, in a number of cases, tape measurements do not provide the desired or required accuracy. Furthermore, the time required to make a plan from tape measurement is, in many cases, prohibitively long. Elaborate optical methods have thus been devised to increase the precision of the measurements and hence permit the obtention of a more accurate plan.

With the advent of the computer age, it has been found desirable to automatically record the measurements directly onto a data recording device and eventually to transfer these data to a computer so as to enable the production of a computerized plan. One such elaborate and complex device is described in U.S. Pat. No. 5,091,869, issued on Feb. 25, 1992 to Ingram et al. Ingram teaches a method for devising a floor plan comprising the selection of traverse points, the setting up of a surveying instrument on the traverse point and measuring distances and angles to prominent points of the floor. A further traverse point is then selected and the process repeated until all the data are collected. The data may then be transferred to a computer and converted into a floor plan. The gathering of the data, according to Ingram et al., is a fastidious and complex operation which requires at least a two person team.

It would thus be an advantage to provide a telemetric spacial data recorder simple to operate that overcomes the drawbacks of the prior art. For example, it would be advantageous to provide a telemetric spacial data recorder that may be operated by a single operator and that enables the operator to devise a floor plan in a relatively short time.

In U.S. Pat. No. 5,675,514 issued on Oct. 7, 1997 to the present applicant and entitled "TELEMETRIC SPACIAL DATA RECORDER", the applicant describes such a spacial data recorder having a base module and a remote module which are liked through an extendable cable. The length and the angular orientation of the extendable cable are measured to determine the relative spacial position of the remote module with respect to the base module. While this spacial data recorder is easy to use and may be manipulated by a single operator, the base module must be repositioned relatively often, which lengthens overall the time required to devise the plan of a floor. Furthermore, the use of an extendable cable between the modules may, in some instances, hinder the use of the system.

OBJECTS OF THE INVENTION

An object of the present invention is therefore to provide an improved telemetric spacial data recorder which overcomes the above discussed drawbacks of conventional and optically based data recording devices.

Another object of the present invention is to provide a telemetric spacial data recorder which enables a single user to measure the spacial coordinates of objects.

SUMMARY OF THE INVENTION

More specifically, in accordance with the present invention, there is provided a telemetric spacial data recorder for devising a floor plan comprising:

a first stationary module defining a spacial reference point;

a second displaceable module;

first means for measuring a distance separating the second module from the first stationary module;

first means for measuring an angular spacial relation between the second module and the first stationary module;

a third movable remote module;

second means for measuring a distance separating the third module from the second module;

second means for measuring an angular spacial relation between the third module and the second module;

third means for measuring a distance separating the third module from a physical surface spacial point;

third means for measuring an angular spacial relation between the physical surface spacial point and the third movable module; and data acquisition unit including (a) means for collecting distance data from said first, second and third distance measuring means, (b) means for collecting angular relation data from said first, second and third angular spacial relation measuring means, and (c) means for calculating a relative spacial position of said physical surface spacial point with respect to said spacial reference point from said distance data and said angular position data.

According to another aspect of the present invention, there is provided a telemetric spacial data recorder for devising a floor plan comprising:

a first displaceable module defining a spacial reference point;

a second movable module;

means for measuring a distance mounted to the first or second modules; the distance measuring means being configured to selectively measure (i) a first distance separating the second movable module from the first displaceable module and (ii) a second distance separating the second movable module from a physical surface spacial point;

means for measuring an angular spacial relation between the second module and the first module and between the physical surface spacial point and the second movable module; and data acquisition means including (a) means for collecting distance data from the distance measuring means, (b) means for collecting angular relation data from the angular spacial relation measuring means, and (c) means for calculating a relative spacial position of the physical surface spacial point with respect to the spacial reference point from the distance data and the angular relation data.

According to another aspect of the present invention, there is provided a telemetric spacial data recorder for devising a floor plan comprising:

a first displaceable module defining a spacial reference point;

a second movable module;

a first distance measuring device mounted to one of the first and second modules; the first distance measuring device being configured to measure a first distance separating the second movable module from the first displaceable module;

a first angular spacial relation measuring device configured to measure an angular spacial relation between the second module and the first module; the first angular spacial relation measuring device including a rotative detecting assembly mounted to the first module for detecting a portion of the second module; the first angular spacial relation measuring device also including means for measuring an angular position of the rotative detecting assembly;

a second distance measuring device mounted to the second module; the second distance measuring device being configured to measure a second distance separating the second movable module from a physical surface spacial point;

a second angular spacial relation measuring device configured to measure an angular spacial relation between the physical surface spacial point and the second movable module; and data acquisition means including (a) means for collecting distance data from the first and second distance measuring devices, (b) means for collecting angular relation data from the first and second angular spacial relation measuring devices, and (c) means for calculating a relative spacial position of the physical surface spacial point with respect to the spacial reference point from the distance data and the angular relation data.

According to yet another aspect of the present invention, there is provided a telemetric spacial data recorder for devising a floor plan comprising:

a first displaceable module defining a spacial reference point;

a second movable module;

a first distance measuring device mounted to one of the first and second modules; the first distance measuring device being configured to measure a first distance separating the second movable module from the first displaceable module;

a first angular spacial relation measuring device configured to measure an angular spacial relation between the second module and the first module;

a second distance measuring device mounted to the second module; the second distance measuring device being configured to measure a second distance separating the second movable module from a physical surface spacial point;

a second angular spacial relation measuring device configured to measure an angular spacial relation between the physical surface spacial point and the second movable module; the second angular spacial relation measuring device including a laser source assembly so mounted to one of the first and second module as to be rotatable about a generally vertical rotation axis; the laser source assembly emitting a laser beam; the second angular spacial relation measuring device also including an angular position measuring device configured to measure an angular position of the laser source assembly and laser beam sensing means mounted to the other of the first and second modules; and data acquisition means including (a) means for collecting distance data from the first and second distance measuring devices, (b) means for collecting angular relation data from the first and second angular spacial relation measuring devices, and (c) means for calculating a relative spacial position of the physical surface spacial point with respect to the spacial reference point from the distance data and the angular relation data.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 4 is a perspective view of a hand held module of the telemetric spacial data recorder of FIG. 1;

FIG. 5 is a schematic top plan view of a floor illustrating the geometrical construction showing generally the required angles and distances required to determine the relative position of a given point with respect to a reference point;

FIGS. 6 to 13 are top plan views of a sequence of operations illustrating a simulation of data recording using the three-module telemetric spacial data recorder of FIG. 1;

FIG. 17 is a schematic top plan view of the telemetric spacial data recorder of FIG. 15;

FIG. 18 is a schematic block diagram illustrating the electrical connexions of the components of the two-module telemetric spacial data recorder of FIG. 14; and FIGS. 19–25 are top plan views of a sequence of operations illustrating a simulation of data recording using the two-module telemetric spacial data recorder of FIG. 15.

DESCRIPTION OF THE PREFERRED EMBODIMENT

Figure 1:
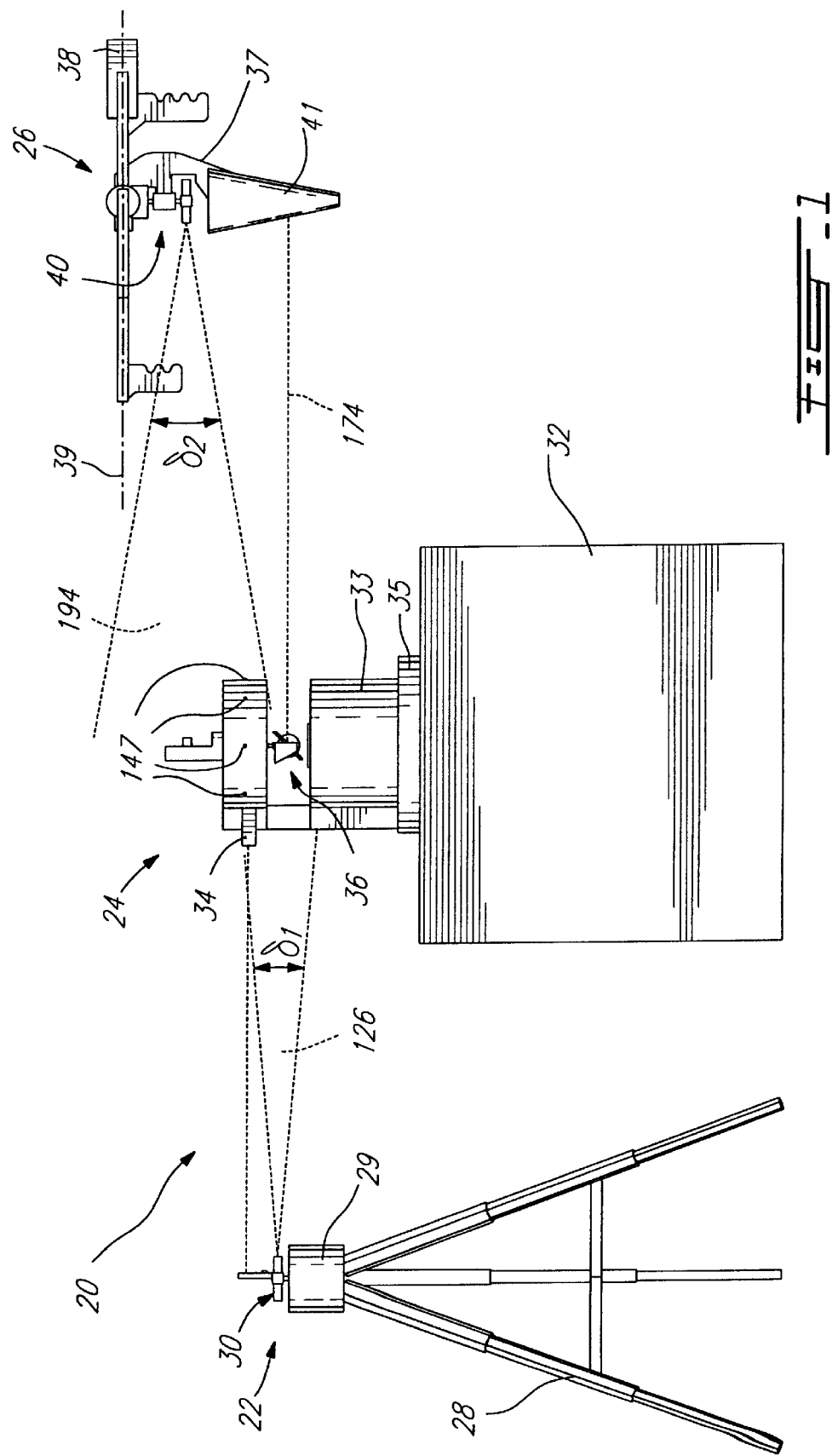
FIG. 1 is a schematic side elevational view of a three-module telemetric spacial data recorder according to a first embodiment of the present invention.

FIG. 1 of the appended drawings illustrates a schematic side elevational view of a three-modules telemetric spacial data recorder 20 according to an embodiment of the present invention. The three-modules telemetric spacial data recorder 20 includes a base module 22, a displaceable remote module 24 and a movable hand held module 26.

The base module 22 includes a support 28 a body 29 and an angular relation measuring device 30 for measuring an angular spacial relation between the remote module 24 and the base module 22. The angular relation measuring device 30 includes an arbitrary horizontal axis (see 58 in FIG. 5) from which it measures the angular relation between the remote module 24 and the base module 22.

The remote module 24 includes a support 32, a body 33, a rotatable connecting element 35 linking the body 33 to the support 32, a distance measuring device 34 for measuring a distance between the remote module 24 and the base module 22 and an angular relation measuring device 36 for measuring an angular spacial relation between the hand held module 26 and the remote module 24. The angular relation measuring device 36 also measures a distance between the remote module 24 and the hand held module 26.

The hand held module 26 includes a body 37 having a longitudinal axis 39 and a conical-shaped projection 41, a distance measuring device 38 for measuring a distance between a target point of a physical surface (see numeral 56 in FIG. 5) and the hand held module 26, and an angular relation measuring device 40 for measuring an angular spacial relation between the target point and the hand held module 26.

Figure 14:
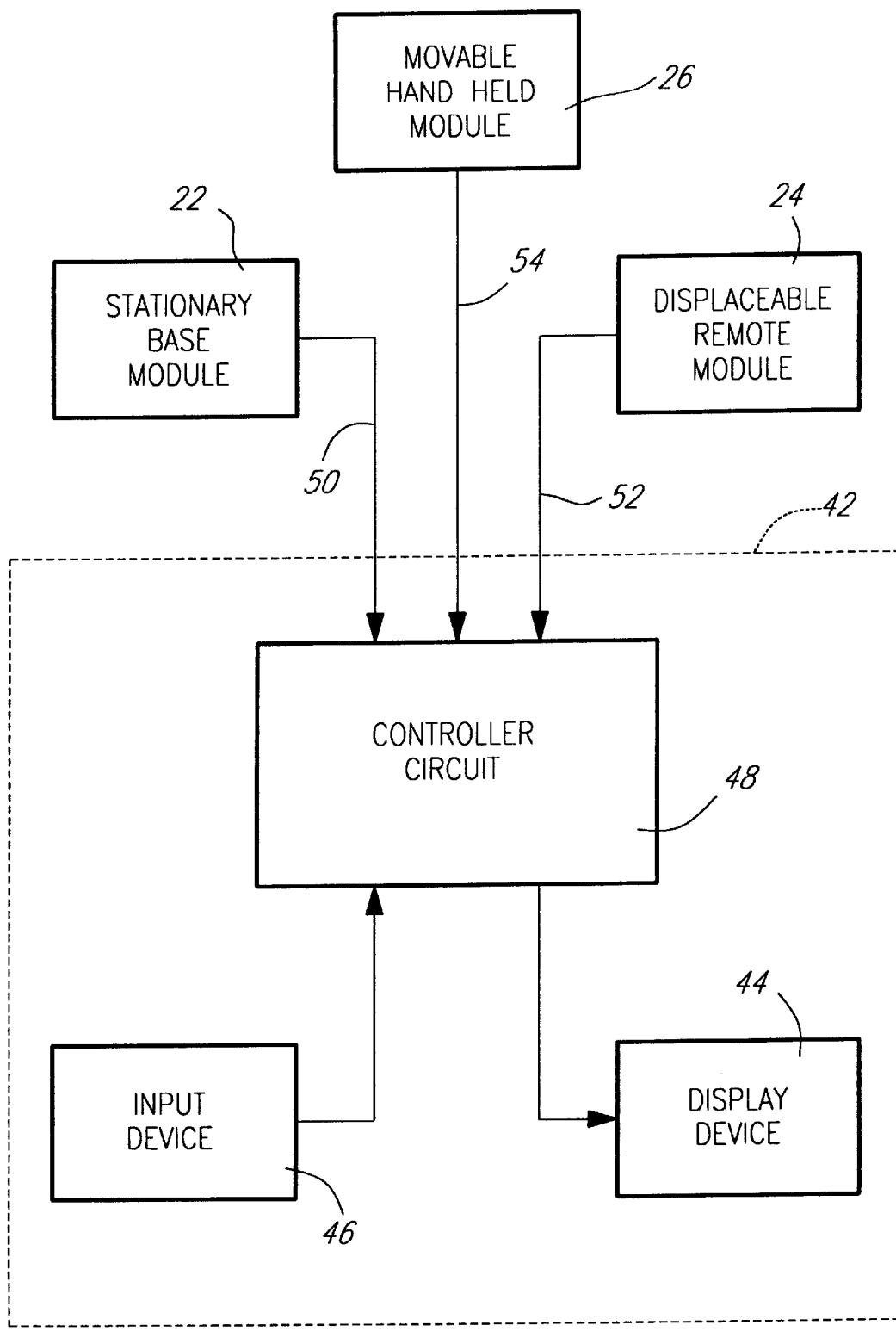
FIG. 14 is a schematic block diagram illustrating the electrical connexions of the components of the three-module telemetric spacial data recorder of FIG. 1.
Figure 15:
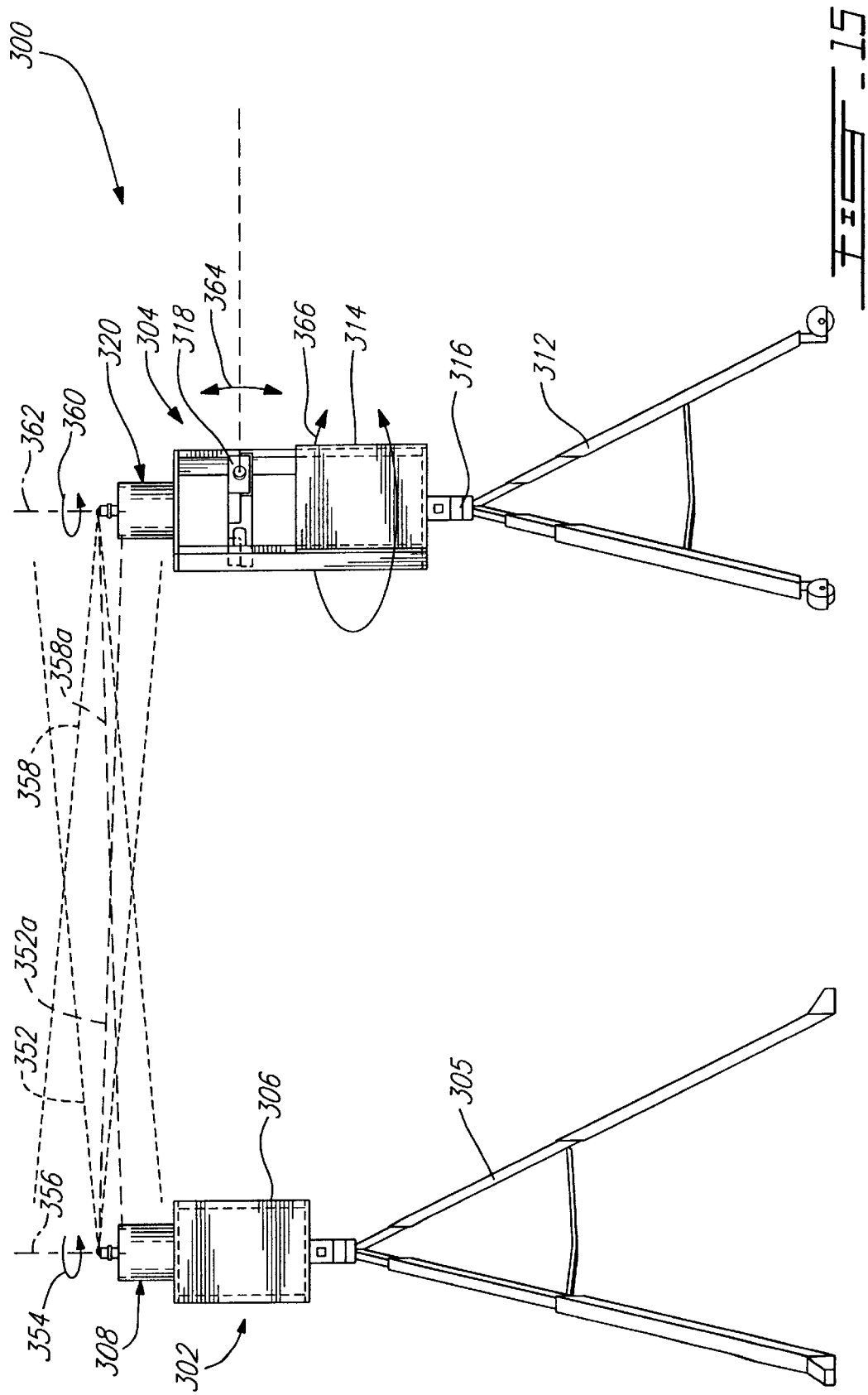
FIG. 15 is a side elevational view of a two-module telemetric spacial data recorder according to a second embodiment of the present invention.

As can be better seen from the block diagram of FIG. 14 of the appended drawings, the three-module telemetric spacial data recorder 20 also includes a data acquisition unit 42 comprising a display device 44, an input device 46 and a controller circuit 48. The controller circuit 48 is electrically connected to the base module 22, the remote module 24 and the hand held module 26 via data/control transmission links 50, 52 and 54, respectively. The data/control links 50, 52 and 54 may be under the form of electrical cables, RF (Radio Frequency) links or any other suitable links.

As will be easily understood by one of ordinary skill in the art, the controller circuit 48 includes data collecting capabilities to collect data from the modules 22, 24 and 26 through the links 50, 52 and 54, respectively.

The input device 46 includes a start acquisition switch (not shown), mounted to the hand held module 26. The input device 46 also includes mode control switches for inputting information in the controller circuit as will be described hereinafter.

Referring now to FIG. 5, the simplified geometrical construction for determining the relative spacial position of a spacial target point of a physical surface (see numeral 56) with respect to a spacial reference point defined by the spacial position of the base module 22 will now be described. The following description is a simplified description since it is assumed that the three modules 22, 24 and 26 and the spacial target point 56 are at the same height level. In other words, it is assumed that the geometrical construction is done on a bi-dimensional level. However, various correction means and/or devices for taking into account the normal differences in height of the three modules 22, 24 and 26 and of the spacial target point 56 will be described herein.

As can be seen in FIG. 5, the base module 22 is positioned at a central location to reduce the need for repositioning the base module. The position of the base module 22 defines a spacial reference point from which the determination of the target points of physical objects, i.e. walls, are performed. The determination of the relative position of a plurality of target points will enable the elaboration of a plan of a floor.

The remote module 24 is positioned so as to be in a line of sight (see dashed line 60) with the base module 22 while being in the vicinity of room entries which are not in line of sight with the base module 22. The angular relation measuring device 30 of the base module 22 measures an angle $\alpha$ defined by the reference axis 58 and the dashed line 60 and supplies this information to the controller circuit 48 through the data/control link 50. On the other hand, the distance measuring device 34 of the remote module 24 measures the distance separating the remote module 24 and the base module 22 along the straight line 60 and supplies this information to the controller circuit 48 through the data/control link 52.

The hand held module 26 is positioned so as to be in line of sight with the remote module 24 (see dashed line 62). The angular relation measuring device 36 of the remote module 24 measures an angle $\beta$ defined by the dashed lines 60 and 62, and supplies this information to the controller circuit 48 through the data/control link 52. The angular relation measuring device 36 also measures the distance separating the hand held module 26 and the remote module 24 along the straight line 62 and supplies this information to the controller circuit 48 through the data/control link 52.

As can be seen in FIG. 5, the longitudinal axis 39 (see FIG. 1) of the hand held module 26 is aligned with the target point 56 (see dashed line 64). The distance measuring device 38 measures a distance separating the hand held device 26 and the target point 56 along the straight line 64 and supplies this information to the controller circuit 48 through the data/control link 54. The angular relation measuring device 40 measures an angle $\gamma$ defined by the dashed lines 62 and 64, and supplies this information to the controller circuit 48 through the data/control link 54.

The controller circuit 48 is configured so as to make a geometrical construction using the distance and angular data supplied to it by the modules 22, 24 and 26. The controller 48 then displays on the display device 44, the relative position of the target point with respect to the reference point. The plan of the floor is therefore elaborated point by point.

Example of Floor Plan Determination

We will now turn to FIGS. 6–13, which are schematic top plan views illustrating an example of the use of the three-module telemetric spacial data recorder 20 to devise the plan of a floor 66 having a plurality of rooms 67, 69 and 71 defining walls 68–78, and room entries 80–84. For each figure, the devised plan is illustrated on the display device 44.

As previously discussed, the first step is to position the base module 22 in a location where it is less likely required to be moved. However, it is to be noted that it is possible to move the base module 22 as will be described hereinafter.

The next step is to position the remote module 24 in line of sight with the base module 22 (see dashed line 60) with the distance measuring device 34 facing the base module 22. The hand held module 26 is then positioned in the room 67 through the entry 80. The longitudinal axis 39 (see FIG. 1) of the hand held module 26 is aligned with a first target point 86 which is an internal corner of the entry 80 which is at a first end of the wall 68. The start acquisition switch (not shown) is then actuated to indicate to the data acquisition unit 42 that a target point 86 is selected and that the relative position of this target point 86 should be calculated and displayed on the display 44. The data acquisition unit 42 then acquires distance and angle data from the modules 22, 24 and 26, and calculates the relative position of the target point 86 as described hereinabove with respect to FIG. 5. Finally, a dot 86a corresponding to the relative position of the target point 86 is displayed on the display device 44.

As can be seen in FIG. 7, the next step is to align the longitudinal axis 39 of the hand held module 26 on a second target point 88 which is a second end of the wall 68, being at the junction of the wall 68 and 70. Using the mode control switches, the operator indicates to the data acquisition unit 42 that the next target point to be entered is to be considered as the end of a straight wall. The start acquisition switch is then actuated to begin the data acquisition process and the calculation process. When the calculations have been done, a second dot 88a is displayed on the display device 44 and the points 86a and 88a are joined by a straight line 90.

It is to be noted that it would be possible to devise floor plan having columns or walls that are not straight by providing appropriate instructions to the data acquisition unit 42. For example, it would be possible to input three target points and to instruct the data acquisition unit 42 to construct an arc of circle connecting the three target points.

The other walls of the room 67 may be devised in the same manner as described hereinabove with respect to FIGS. 6 and 7.

FIG. 8 illustrates the room 67 which has been devised and the hand held module 26 aligned with a target point 92 which is an external corner of the entry 80.

Figure 10:
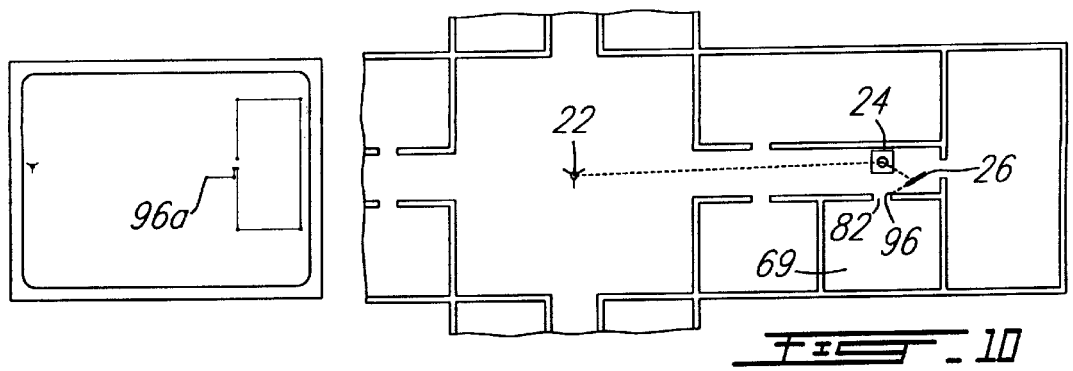

FIG. 9 illustrates the hand held module 26 aligned with a target point 94 which is at the junction of walls 72 and 74, while FIG. 10 illustrates the hand held module 26 aligned with a target point 96 which is an external corner of the entry 82 of room 69.

The floor plan of the room 69 is then devised as explained hereinabove.

Figure 11:
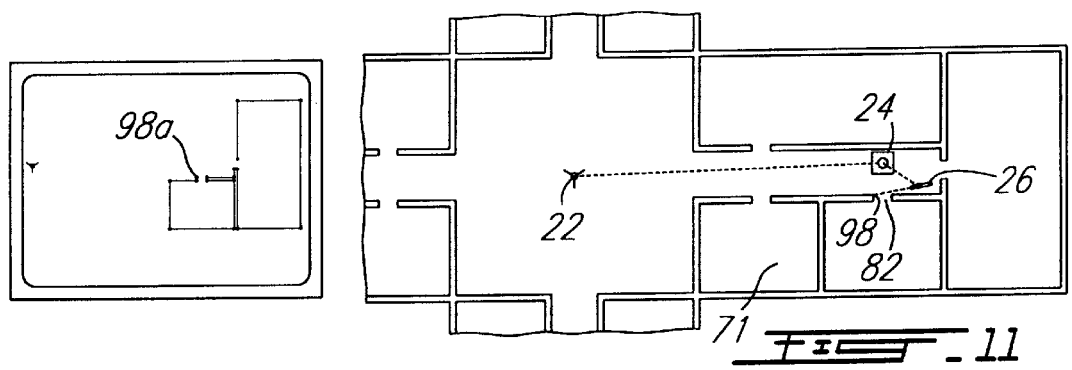

FIG. 11 illustrates the determination of the relative position of a target point 98 which is an external corner of the entry 82. This is the last target point to be determined before the reposition of the remote module 24 to devise the floor plan of the room 71.

It is to be noted that the floor plan of the rooms 67 and 69 have been devised by the three-module telemetric data recorder by the repeated movements of the hand held module 26 and without the repositioning of the remote module 24.

Figure 12:
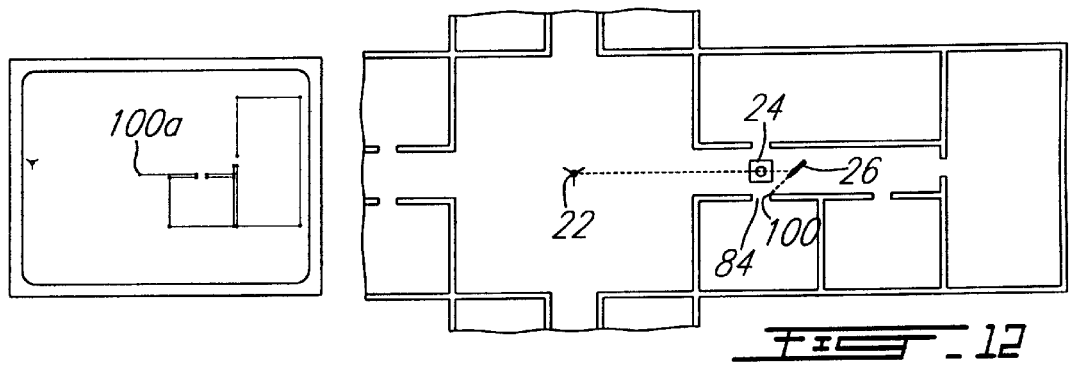

As can be seen in FIG. 12, the remote module 24 is repositioned so that it is possible to devise the floor plan of room 71. The repositioning of the remote module 24 is done in a similar manner as its original positioning.

The hand held module is aligned with a target point 100 which is an external corner of entry 84.

Figure 13:
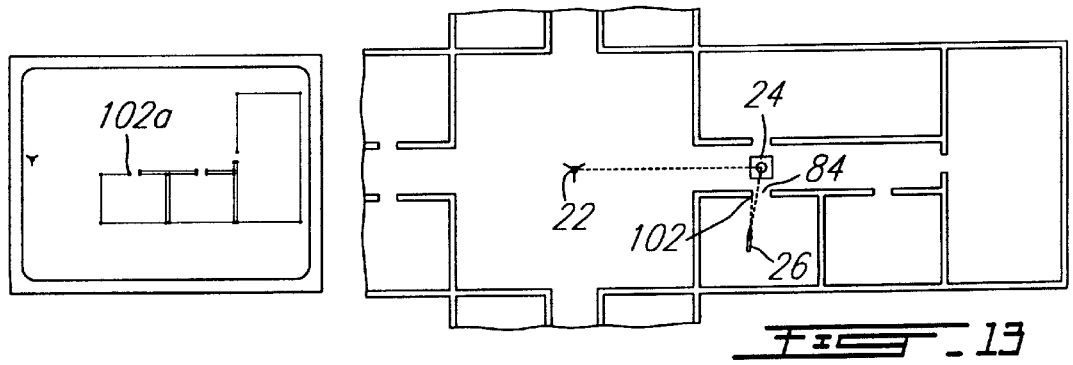

The floor plan of the room 71 is then devised as explained hereinabove, as can be seen from FIG. 13, which illustrates the hand held module 26 aligned with a target point 102 which is an internal corner of the entry 84, and the last step required to devise the floor plan of room 71.

Of course, the rest of the floor 66 is devised as explained hereinabove.

Figure 2:
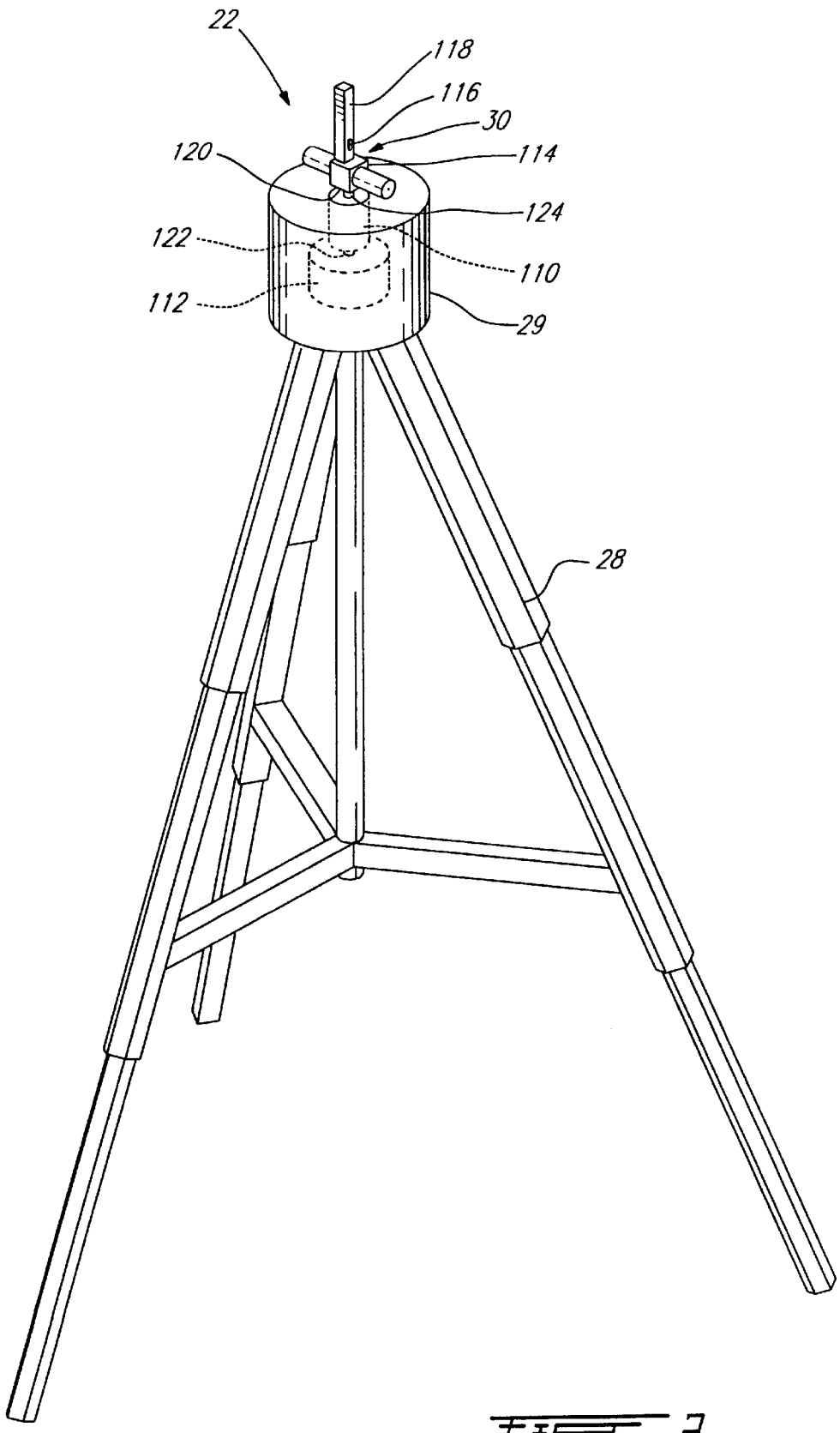
FIG. 2 is a perspective view of a base module of the telemetric spacial data recorder of FIG. 1.

Turning now to FIG. 2, the base module 22 will be described in greater details.

As mentioned hereinabove the body of the stationary base module 22 is mounted to a support 28. The angular relation measuring device 30 for measuring an angular relation between the remote module 24 and the base module 22 is mounted to the body 29.

The angular relation measuring device 30 includes an electric stepper motor 110, a rotary encoder 112, a laser source 114 and an optical sensor 116. The base module 22 also includes a target surface 118. It is to be understood that, for clarity purposes, a plurality of brackets for maintaining the above mentioned elements in predetermined positions with respect to one another have not been included in FIG. 2.

The electric stepper motor 110 in centrally mounted in the body 29 and includes a rotary shaft 120 going through the motor 110. The shaft 120 includes a lower portion 122 fixedly mounted to the rotary encoder 112 and an upper portion 124 fixedly mounted to the laser source 114. The rotary encoder 112 therefore measures the angular position of the laser source 114 with respect to a reference position (not shown) of the rotary encoder 112 and supply this information to the controller circuit 48 through the data/control link 50. The operation of a rotary encoder is believed well known in the art and will not be further discussed herein.

As can be better seen in FIG. 1, the laser source 114 emits a fan-shaped laser beam 126 defining a dispersion angle $\delta_1$. The remote module 24 includes a mirror 128 (see FIG. 3) which reflects a portion of the laser beam back to the base module 22 when the laser source 114 faces the remote module 24. The sensor 116 faces in the same direction as the laser source 114. The dispersion angle $\delta_1$ of the laser beam 126 may vary, but it has been found that an angle of 10° is usually sufficient.

It is to be noted that the mirror 128 may be slightly convex to allow greater height differences between the base module 22 and the remote module 24 while reflecting a portion of the beam 126 back towards the base module 22 to be detected by the sensor 116.

The operation of the base module 22 will now be described. The controller circuit 48, through the data/control link 50, energizes both the laser source 114 and the motor 110. The laser source 114 is therefore rotated and the laser beam 126 performs a circular sweep. When the laser beam 126 encounters the mirror 128 of the remote module 24, a portion of the laser beam is reflected back towards the base module 22. The sensor 116 detects the reflected laser beam and supply this information to the controller circuit 48.

The controller 48 stores a first angular position of the encoder 112 and then actuates the stepper motor 110 until the sensor 116 no longer detects the reflected laser beam. A second angular position of the encoder 112 is then stored and an algebraic means of the first and second angular positions is calculated to determine a more precise angular relation between the remote module 24 and the base module 22.

As will be apparent to one skilled in the art, it would be possible to replace the rotary encoder 112 by an electronic circuit (not shown) that would count and store the number of steps performed by the stepper motor 110 to thereby determine the angular orientation of the laser source 114. This electronic circuit would supply this information to the controller circuit 48 upon demand.

As will also be apparent to one skilled in the art, other mechanisms could be designed to cause the laser beam 126 to rotate. For example, the laser source 114 could be fixedly and vertically mounted in the body 29 and a prism could be rotatably mounted to the body 29 to cause a 90 degrees deflexion of the laser beam while rotating it about a vertical axis.

Figure 3:
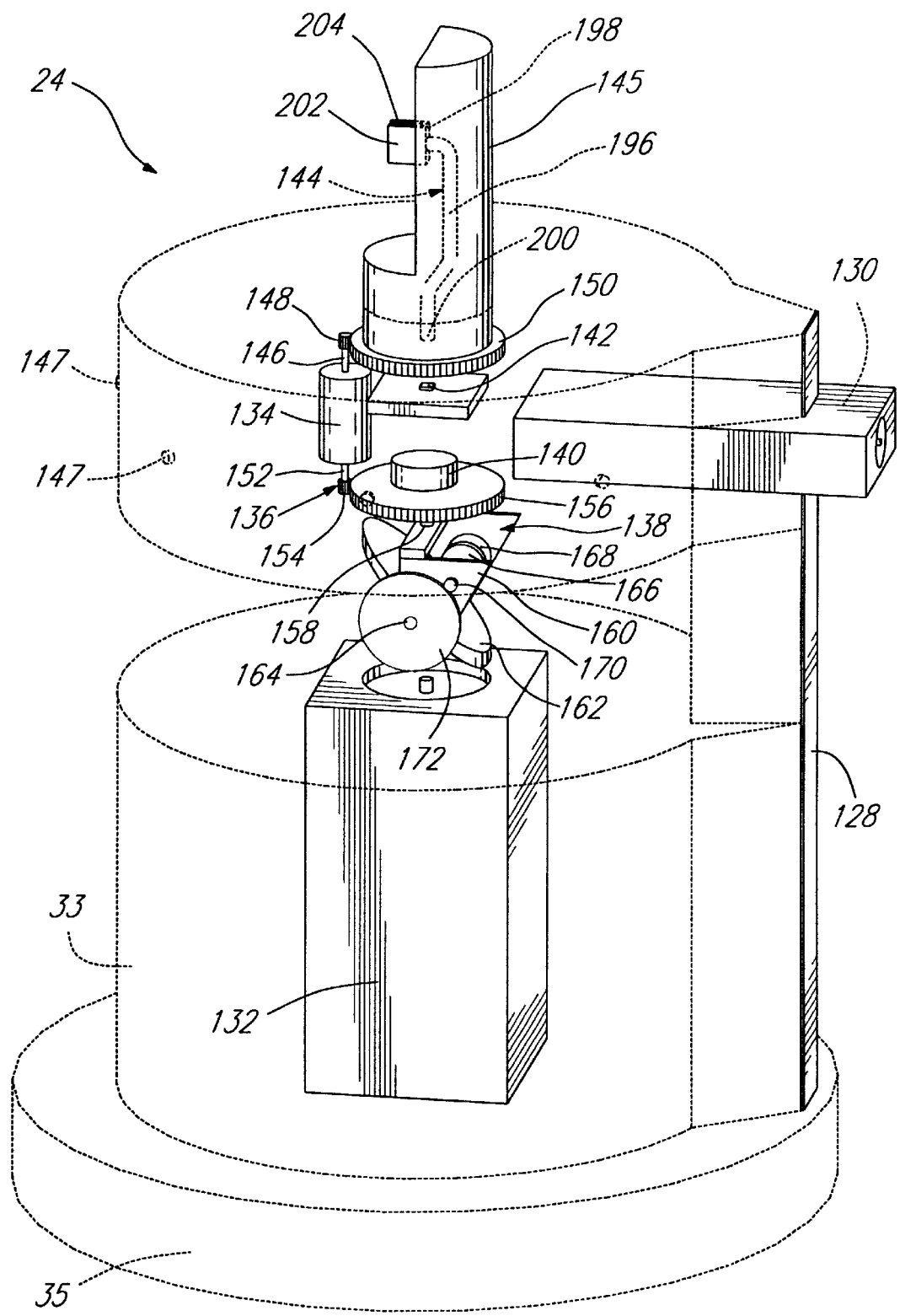
FIG. 3 is a perspective view of a portion of a displaceable module of the telemetric spacial data recorder of FIG. 1.

Turning now to FIG. 3, the remote module 24 will be described in greater details, the body 29 being illustrated in dashed lines for clarity purposes.

The distance measuring device 34 of the remote module 24 includes a first laser rangefinder 130. The angular relation measuring device 36 includes a second laser rangefinder 132, a stepper motor 134 provided with a shaft 136, a rotatable mirror assembly 138, a rotary encoder 140, an optical sensing element 142, optical energy transmission means 144 mounted to a rotative support 145, and a plurality of optical detectors 147. It is to be understood that, for clarity purposes, a plurality of brackets for maintaining the above mentioned elements in predetermined positions with respect to one another have not been included in FIG. 3.

An upper portion 146 of the shaft 136 of the stepper motor 134 is provided with a friction wheel 148 which is in contact with a larger friction wheel 150, secured to the rotative support 145.

A lower portion 152 of the shaft 136 is provided with a friction wheel 154 which is in contact with a larger friction wheel 156 that is connected to the mirror assembly 138 through a shaft 158. The rotary encoder 140 is also connected to the shaft 158.

Rotation of the stepper motor 134 therefore causes the rotation of the rotative support 145 and of the mirror assembly 138. The rotary encoder 140 measures the angular orientation of both the rotative support 145 and the mirror assembly 138.

The rotatable mirror assembly 138 includes a bracket 160 fixedly mounted to the shaft 158, a mirror 162 pivotally mounted to the bracket 160 through a shaft 164, a stepper motor 166 provided with a shaft (not shown) connected to a rotary encoder 168 and to a friction wheel 170. The friction wheel 170 is in contact with a larger friction wheel 172 which is fixedly mounted to the shaft 164.

Rotation of the stepper motor 166 therefore causes the mirror 162 to pivot about the shaft 164. The pivot angle of the pivoting mirror 162 is measured by the rotary encoder 168. Since a laser beam (see 174 in FIG. 1) emitted by the second laser rangefinder 132 is reflected by the mirror 162, the variation of the pivot angle of the mirror 162 will modify the angle formed by the laser beam 174 and a hypothetical horizontal line (not shown).

The operation of the remote module 24 will now be described in greater details.

The first laser rangefinder 130 is used to determine the distance between the remote module 24 and the base module 22, and to align the remote module 24 at a predetermined angular orientation with respect to the base module 22. The first laser rangefinder 130 includes a visible laser source (not shown) allowing the manual positioning of the remote module 24 in such a way that the laser rangefinder 130 faces the base module 22. The operator only has to align the rangefinder 130 so that a laser dot appears on the target 118 of the base module 22 (see FIG. 2). To do so, the operator may rotate the body 33 of the module 24 through the rotatable connecting element 35 between the body 33 and the support 32. The laser rangefinder 130 may then calculate the distance separating the remote module 24 from the geometrical center of the base module 22. Indeed, as can be seen from FIG. 2, the target 118 in off-centered in such a way that its surface is aligned with the geometrical center of the body 29. Of course, the distance information data is supplied to the controller circuit through the data/control link 52.

It is to be noted that since the remote module is not constantly repositioned, the rate of measurements of the laser rangefinder 130 is not critical, therefore a less expensive rangefinder may be used.

The second laser rangefinder 132 is used to measure both the distance and the angular relation between the remote module 24 and the hand held module 26. Again, the distance data and the angular orientation data are supplied to the controller circuit 48 through the data/control cable 52. It is to be noted that the rate of measurements of the laser rangefinder 132 is required to be relatively high, for example a measurement rate of about 1000 measurements per second has been found adequate.

The general operation principle consists in rotating the motor 134 until the controller circuit 48 detects the semi-circular shape of the conical projection 41 of the hand held module 26. When this is done, the controller circuit 48 may calculate the distance between the remote module 24 and the geometrical center of the conical projection 41 with the data supplied by the rangefinder 132. Furthermore, the controller circuit 48 may calculate the angular relation between the remote module 24 and the hand held module 26 with the data supplied by the rotary encoder 140.

More specifically, the controller circuit 48 energizes the stepper motor 134 and analyses the distance readings supplied by the laser rangefinder 132. When the controller circuit 48 detects that the object read is semi-circular, it notes the angle and distance at the beginning of the semi-circle, the angle and distance at the end of the semi-circle and the distance at the midpoint between these two angles. The controller 48 then calculates the radius of the circle and the distance between the center of the circle and the remote module 24.

It is to be noted that, since the projection 41 of the hand held module 26 is conical, the controller circuit 48 may determine which portion of the projection 41 is "scanned" by the rangefinder 132 and may pivot the mirror 162 to "scan" a portion of the projection 41 having a predetermined radius and make compensations on the distance reading depending on the data supplied by the encoder 168. Therefore, the pivot movements of the mirror 162 compensates for the difference in height between the remote module 24 and the hand held module 26.

The controller circuit 48 controls the stepper motor 134 so that it sweeps back and forth in the area where the conical projection 41 is located while taking repeated distance readings, so as to follow the movements of the hand held module 26.

The operation of the optical sensing element 142, the optical energy transmission means 144 and the plurality of optical detectors 147 will be described hereinafter with reference to the hand held module 26.

Turning now to FIG. 4, the hand held module 26 will be described in greater details.

The hand held module 26 includes a handle assembly 175 provided with a pair of handles 176, 178 and a laser rangefinder 180 forming the distance measurement device 38.

The conical projection 41 is pivotally mounted to the handle assembly 175 through a shaft 182. A rotary encoder 184 is connected to the shaft 182 to measure the angle defined by the handle assembly 175 and the conical projection 41 which is generally held vertical by gravity. The encoder 184 therefore measures the aiming angle of the handle assembly 175. An inclinometer 185 is provided in the conical projection 41 to measure the attitude of the conical projection 41 with respect to a horizontal plane. Of course, the rotary encoder 184 and the inclinometer 185 supply data to the controller circuit 48 through the data/control link 54.

As will be apparent to one skilled in the art, the data supplied by the inclinometer 185 allows the controller circuit 48 to make correction on distance measurements supplied by the laser rangefinder 180.

The angular relation measuring device 40 includes a stepper motor 186 provided with a shaft 188 which is connected to a laser source 190 and to a rotary encoder 192. Therefore, rotation of the shaft 188 causes the rotation of the laser source 190, and the angular orientation of the laser source 190 is measured by the encoder 192.

The operation of the hand held module will now be described in greater details.

The laser rangefinder 180 measures the distance between the hand held module 26 and a target point of a physical surface (see for example numeral 56 in FIG. 5) and supplies this information to the controller circuit 48 through the data/control link 54. It is to be noted that the laser rangefinder 180 is provided with a visible laser source (not shown) to produce a visible dot on the target point of the physical surface to assist the operator.

As can be better seen from FIG. 1, the laser source 190 emits a fan-shaped laser beam 194 defining a dispersion angle $\delta_2$. The dispersion angle $\delta_2$ of the laser beam 194 may vary, but it has been found that an angle of 20° is usually adequate.

The optical detectors 147 and the optical sensor 142 (see FIG. 3) of the remote module 24 receive a portion of the laser beam 194 when the beam 194 is directed towards the remote module 24.

The optical transmission means 144 include optical fibres 196 having a first end 198 protruding from the support 145 and a second end 200 aligned with the optical sensor 142. Optical energy is therefore transferred from the first end 198 of the optical fibres 196 to the optical sensor 142. This characteristic offers the advantage that the sensor 142 may be fixedly mounted to the body 33 and receive an optical signal from any direction through the optical fibres 196.

When the sensor 142 receives a portion of the beam 194, this data is supplied to the controller circuit 48 through the data/control link 52. The controller 48 then records the data supplied by the encoder 192 and may calculate the angle orientation between the longitudinal axis 39 (FIG. 1) of the hand held module 26 and the remote module 24. Indeed, the encoder includes a reference angular orientation (not shown) against which it measures angles.

There are eight (8) optical detectors 147 equidistantly mounted to the periphery of the body 33 of the remote module 24. Upon rotation of the stepper motor 186, the laser beam 194 performs a circular sweep and eventually some of the detectors 147 receive a portion of the beam 194 and supply this information to the controller 48. Depending on which detectors 147 receive a portion of the beam 194, the controller 48 determines an approximate angular orientation of the hand held module 26 with respect to the remote module 24. The controller 48 will restrict the rotation of the stepper motor 134 in the approximate angular orientation to detect the semi-circular shape of the projection 41 as described hereinabove. The time required to the remote module 34 to "find" the hand held module 26 will therefore be decreased.

Similarly, the optical transmission means 142 includes a pair of blinder plates 202 and 204, mounted on either sides of the first end 198 of the optical fibres 196, that allow the laser beam 194 to enter the first end 198 of the optical fibre 196 only when the first end 198 almost faces the hand held module 26, therefore creating a more precise approximate angular orientation which further reduces the time required to the remote module 24 to "find" the hand held module 26.

Returning to more general considerations, it is to be noted that the method used to reposition the base module 22 is the same as in the U.S. Pat. No. 5,675,514, issued to the present applicant, which is hereby incorporated by reference. In short, before moving the base module 22 from its original position, at least two target points are selected and their relative position is calculated. The base module is then moved to its new position and the relative position of the same target points is calculated. As will be apparent to one of ordinary skill in the art, with this information the data acquisition unit 42 may calculate the new position of the base module 22. Another method would be to manually overlay the corresponding target points to reconstruct the entire floor plan from the floor plans of adjacent rooms.

The support 32 may include an access panel (not shown) providing a place to put away the base module 22 and the hand held module 26 when they are not in use.

The controller circuit 48 may include a plurality electronic circuits (not shown) mounted to each module 22, 24 and 26 and linked to the various elements (motors, laser sources, rotary encoders, laser rangefinders, etc) of these modules. The controller circuit 48 may also include microcontrollers or any suitable circuits to enable the controller circuit 48 to perform the above mentioned calculations. For example the controller circuit 48 could be embodied by a personal computer running a suitable software.

As will be apparent to one of ordinary skill in the art, the controller circuit 48 may include many override procedures to compensate for errors in the operation of the three-module telemetric spacial data recorder. For example, an override procedure may be designed to force the rotation of the stepper motor 110 of the base module 22 should a surface other than the mirror 128 of the remote module 24 reflect the beam 126 of the laser source 114.

Of course, the controller circuit 48 is supplied with the data concerning the physical dimensions of the various components of the modules 22, 24 and 26 and may therefore calculate the angle orientations and the distances from the geometrical centers of the modules.

As previously mentioned, any rotary encoder connected to a shaft of a stepper motor could be replaced by an electronic circuit (not shown) that would count the number of steps done by the stepper motor and translate this number of steps into an angle.

As will be understood by one of ordinary skill in the art, the laser rangefinders 130, 132 and 180 could be replaced by other electronic distance measurement devices.

It is also to be noted that if relatively small floor plans are to be devised, the use of the base module 22 is not required. If the base module 22 is not used, the three-module telemetric spacial data recorder becomes a two-module telemetric spacial data recorder. When this is the case, the controller treats the displacement of the remote module 24 as it would treat the displacement of the base module 22 in a three-module system, i.e. that two target points are recorded before and after the displacement of the remote module 24 to determine the new position of the remote module as described hereinabove.

Turning now to FIGS. 15–25 a two-module telemetric spacial data recorder 300 according to a second embodiment of the present invention will be described.

The two-module system 300 includes a displaceable remote module 302 and a movable module 304.

The remote module 302 includes a support 305 a body 306 and an angular relation measuring device 308 for measuring an approximate angular spacial relation between the remote module 302 and the movable module 304 as will be described hereinafter. The angular relation measuring device 308 includes an arbitrary horizontal axis (see 310 in FIG. 17) from which it measures the approximate angular relation between the remote module 302 and the movable module 304.

The movable module 304 includes a support 312, a body 314, a rotatable connecting element 316 linking the body 314 to the support 312, a distance measuring device under the form of a laser rangefinder 318 for alternatively measuring (a) a distance between the movable module 304 and the remote module 302 if it is pointed towards the remote module 302, and (b) a distance between the movable module 304 and a target point of a physical surface (as will be described hereinafter with respect to FIGS. 19–25) if it is pointed towards this target point, and an angular relation measuring device 320 for measuring an approximate angular spacial relation between the movable module 304 and the remote module 302. It is to be noted that the angular relation measuring device 320 is identical to the angular relation measuring device 308 of the remote module 302.

As can be better seen from the block diagram of FIG. 18 of the appended drawings, the two-module telemetric spacial data recorder 300 also includes a data acquisition unit 322 comprising a display device 324, an input device 326 and a controller circuit 328. The controller circuit 328 is electrically connected to the remote module 302 and to the movable module 304 via data/control transmission links 330 and 332, respectively. The data/control links 330 and 332 may be under the form of electrical cables, RF (Radio Frequency) links or any other suitable links.

As will be easily understood by one of ordinary skill in the art, the controller circuit 328 includes data collecting capabilities to collect data from the modules 302 and 304 through the links 330 and 332, respectively.

The input device 326 includes a start acquisition switch (not shown), mounted to the movable module 304. The input device 326 also includes mode control switches for inputting information in the controller circuit as will be described hereinafter.

As will be apparent to one skilled in the art, the data acquisition unit 322 is advantageously mounted to the module 304 so that the display device 324 and the input device 328 are within reach of the operator taking measurements.

Figure 16:
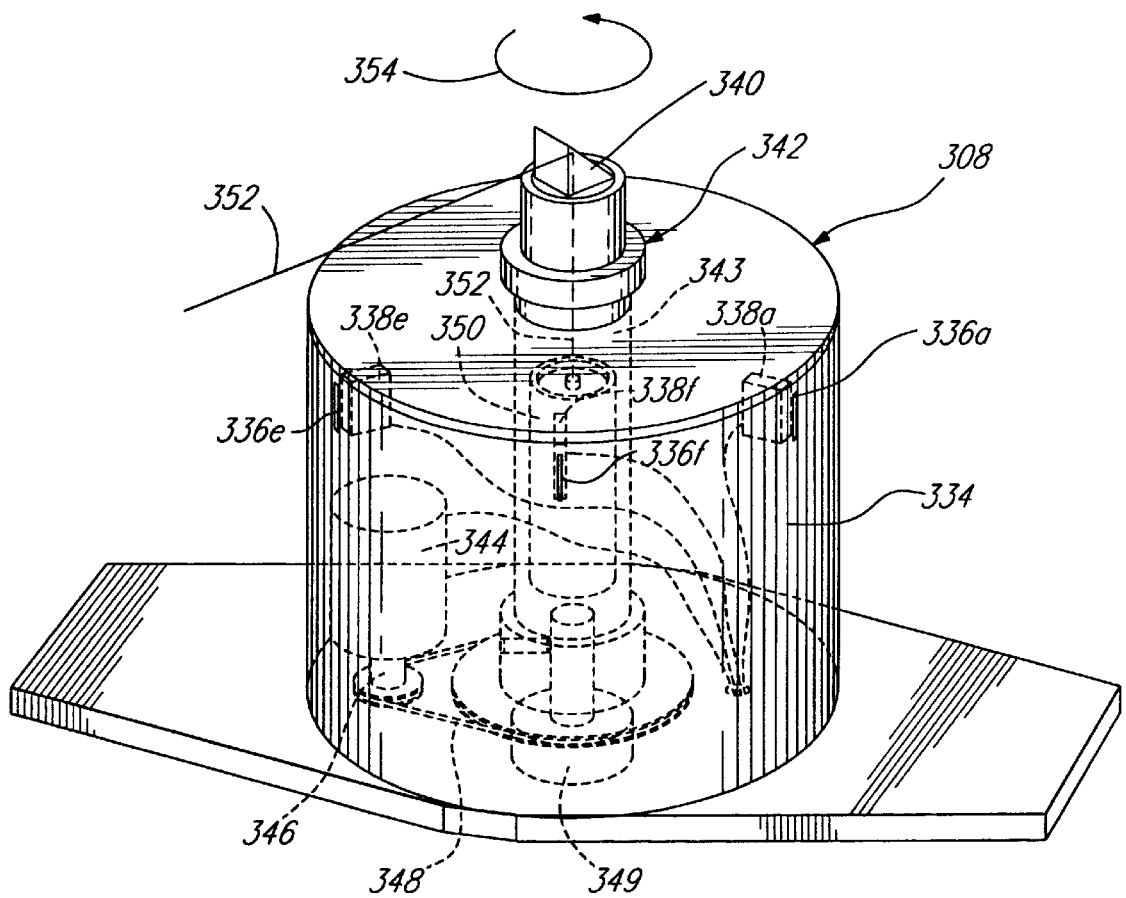
FIG. 16 is a perspective view of an angular relation measuring device of the telemetric spacial data recorder of FIG. 15.

Turning now to FIG. 16 of the appended drawings, the angular relation measuring device 308 will be described in details. It is to be noted that the angular relation measuring device 320 is identical to the angular relation measuring device 308 and will not be described in details herein.

The angular relation measuring device 308 includes a tubular body 334 provided with six equidistant peripheral apertures 336a–336f (only three shown in FIG. 15), six laser beam sensors 338a–338f (only three shown in FIG. 15) so mounted to the tubular body 334 as to be aligned with a corresponding aperture 336. The angular measuring device 308 also includes a prism 340, a prism rotatable support assembly 342 provided with a hollow cylindrical tube 343, an electric motor 344 provided with a driving shaft 346 connected to the support assembly 342 via a driving belt 348. A rotary encoder 349 is connected to the rotatable support assembly 342 to measure the angular position thereof. A laser source 350 is so mounted in the hollow cylindrical tube 343 as to emit a generally fan shape (see FIG. 15) laser beam 352 along axis of the body 334. The laser beam 352 is reflected by the prism 340.

The operation of both the electric motor 344 and the laser source 350 are controlled by the controller circuit 328. Similarly, the laser beam sensors 338a–338f and the rotary encoder 349 are connected to the controller circuit 328 to supply data thereto.

Returning briefly to FIG. 15, when the motor 344 and the laser source 350 are energized, the generally fan-shaped laser beam 352 rotates (see arrow 354) about a vertical axis 356. Similarly, when the motor 344 and the laser source 350 of the angular relation measuring device 320 are energized, a generally fan-shaped laser beam 358 rotates (see arrow 360) about a vertical axis 362.

The laser rangefinder 318 is pivotally mounted (see arrow 364) to the body 314 which is itself rotatably connected to the support 312 (see arrow 366). The user may therefore manually pivot and rotate the laser rangefinder 318 to aim at different target points to measure a distance between the laser rangefinder 318 and the target point.

Referring now to FIG. 17, a simplified geometrical construction for determining the relative spacial position of a spacial target point of a physical surface (see numeral 368) with respect to a spacial reference point defined by the geometrical center 370 of the remote module 302 will now be described. It is to be noted that the following description is a simplified description since it is assumed that the modules 302 and 304 and the spacial target point 368 are at the same height level. In other words, it is assumed that the geometrical construction is done on a bi-dimensional level. However, various correction means for taking into account the normal differences in height of the modules 302, 304 and of the spacial target point 368 are contemplated. For example, as described hereinabove, the laser sources 350 emit generally fan-shaped laser beams 352 and 358 so as to minimize the importance of height differences between the modules 302 and 304. Also, the pivotement of the laser rangefinder 318, that is encoded by a rotary encoder (not shown) and supplied to the controller circuit 328, is taken into account for distance calculations. Furthermore, the module 304 is provided with at least one inclinometer (not shown) to measure the attitude of the module 304 with respect to a horizontal plane and to supply this information to the controller circuit 328. The controller 328 may thus take the attitude of the module 304 into consideration when calculating the relative position of a target point.

The position of the remote module 302 defines a spacial reference point from which the determination of the target points of physical objects, i.e. walls, are performed. The determination of the relative position of a plurality of target points will enable the elaboration of a plan of a floor.

To determine the relative position of a single target point (for example target point 368 in FIG. 17), the following parameters must be measured or calculated:

the distance between the geometrical center 370 of the remote module 302 and a geometrical center 372 of the module 304, this distance is illustrated as $D_1$ in FIG. 17;

the distance between the geometrical center 372 of the module 304 and the target point 368, this distance is illustrated as $D_3$ in FIG. 17;

an angular spacial relation between the movable module 304 and the remote module 302, this angular relation being illustrated in FIG. 17 by angle $\xi$ defined by the reference axis 310 and a dashed line 374 joining the geometrical centers 370 and 372;

an angular spacial relation between the target point 368 and the movable module 304, this angular relation being illustrated in FIG. 17 by angle $\xi'$ defined by the reference axis 376 and the dashed line 374 joining the geometrical centers 370 and 372.

When these informations are known, it is possible to determine the relative spacial position of the target point 368 with respect to the reference point 370 as will be described hereinafter.

To determine the distance $D_1$ separating the two geometrical centers 370 and 372, the laser rangefinder 318 is rotated from its position illustrated in FIG. 17 to aim at a predetermined position (not shown) on the body 334 of the angular relation measuring device 308. The distance between the laser rangefinder 318 and the body 334 is thereby measured and this data is supplied to the controller 328. The controller circuit 328 may thus add the radius of the body 334 and the known length separating the center 372 and the tip of the rangefinder 318 to this measure to calculate the distance between the two geometrical centers 370 and 372. As mentioned hereinabove, a correction factor may also be introduced to take into consideration the aiming angle of the laser rangefinder 318.

To determine the distance $D_3$ separating the geometrical center 372 and the target point 368, the laser rangefinder 318 is positioned as illustrated in FIG. 17 so that it is aligned with the target point 368. The distance between the laser rangefinder 318 and the target point 368 is thereby measured and this data is supplied to the controller 328. The controller circuit 328 may thus add the known length separating the center 372 and the tip of the rangefinder 318 to this measure to calculate the distance between the two geometrical centers 370 and 372. Again, a correction factor may also be introduced to take into consideration the aiming angle of the laser rangefinder 318.

The determination of the angular spacial relation between the movable module 304 and the remote module 302, illustrated in FIG. 17 by angle $\xi$ defined by the reference axis 310 and the dashed line 374 will now be described. FIG. 17 illustrates a schematic top plan view of the two modules 302 and 304. In this figure, a portion 352a of the rotating laser beam 352 is detected by the laser sensor 338e′ (not shown) through the aperture 336e′. Similarly, a portion 358a of the rotating laser beam 358 is detected by the laser sensor 338b′ (not shown) through the aperture 336b′.

It is to be noted that these detections are not required to occur at the same time. Indeed, since the laser beams rotate at a rate of about 5–10 revolutions by seconds the time separating the two detections will be small.

Upon the detection of the laser beam 352a by the sensor 338e′ through an aperture 336e′, a signal is supplied to the controller circuit 328 that then takes a measurement of the angle $\mu$ via the rotation encoder 349. The controller circuit 328 is also notified that the laser sensor 338b has detected the laser beam 358 through an aperture 336b. The angle $\nu$ is therefore known (in this case, it is 60 degrees since the apertures 326 are equidistant around the body 334). The angle $\sigma$ may therefore be calculated as being the difference between $\mu$ and $\nu$. The distance $D_2$ is the radius of the body 334.

These angle values denoted with a prime sign are also measured and/or calculated for the angular relation measuring device 320.

As will be easily understood by one skilled in the art, a good approximation of the angle $\xi$ is given by the following formula that may easily be implemented in the controller circuit 328:

$$\xi = \mu - \arctan\left(\frac{D_2\left(\sin\left(\sigma' - \arctan\left(\frac{D_2\sin(\sigma)}{D_1 - D_2\cos(\sigma)}\right)\right)\right)}{D_1 - D_2\cos(\sigma')}\right)$$

Similarly, the angle $\xi'$ may be approximated by the following formula:

$$\xi' = \mu' + \arctan\left(\frac{D_2\left(\sin\left(\sigma - \arctan\left(\frac{D_2\sin(\sigma')}{D_1 - D_2\cos(\sigma')}\right)\right)\right)}{D_1 - D_2\cos(\sigma)}\right)$$

Therefore, the controller circuit may calculate the relative angular position of the target point 368 via the two calculated distances $D_1$ and $D_3$, the known radius $D_2$, the measured angles $\mu$ and $\mu'$ and the known angles $\nu$ and $\nu'$.

As mentioned hereinabove, the calculated distances $D_1$ and $D_3$ may be corrected for height level differences between the module 302, the module 304 and the target point 368.

First Example of Floor Plan Determination

FIGS. 19–25 of the appended drawings are schematic top plan views illustrating an example of the use of the telemetric spacial data recorder 300 illustrated in FIGS. 15–18 to devise the plan of a floor 390 having a plurality of walls 392–396 and a column 398 having a circular cross-section. For each figure, the devised plan is illustrated on the display screen 324.

To devise the plan of the floor 390, the remote module 302 is first placed at an arbitrary position on the floor 390. The movable module 304 is also positioned on the floor 390 in a position where target points are in a line of sight.

The laser rangefinder 318 is then rotated to aim at a predetermined location on the module 302 (FIG. 19) to measure the distance $D_1$ that is supplied to the controller circuit 328.

The laser rangefinder 318 is then aimed at a first target point 400 that is the beginning of the wall 392 (FIG. 20) and a key of the movable module 304 is actuated to start the data acquisition of the spacial coordinates of the target point 400. When the calculations are over, a dot 400a is displayed on the screen 324 to illustrate the relative spacial coordinates of the beginning of the wall 392.

The laser rangefinder 318 is then rotated so as to aim at the target point 402 that is at the junction of the wall 392 and the column 398 (FIG. 21). The user actuates a key of the movable module 304 to indicate to the controller circuit 328 that a straight line will be entered and then actuates the key to start the data acquisition of the relative spacial coordinates of the target point 402. When the calculations are over, a dot 402a and a straight line 404 joining the dot 400a to the dot 402a are displayed on the screen 324. Of course, the dot 402a corresponds to the location of the target point 402.

The laser rangefinder 318 is then aimed at an arbitrary position 406 on the column 398 (FIG. 22). The user actuates a key of the movable module 304 to indicate to the controller circuit 328 that an arc of circle will be entered and then actuates the key to start the data acquisition of the relative spacial coordinates of the target point 406. When the calculations are over, a dot 406a corresponding to the location aimed by the laser rangefinder 318 is displayed on the screen 50.

The controller circuit 328 requires a third relative spacial coordinate to determine the radius of the circular cross-section of the column 398.

To enable the laser rangefinder 318 to aim at the junction of the column 398 with the wall 394, the movable module 304 must be displaced. FIG. 23 illustrates the module 304 in its new position where the target point 408 is visible. Since the module 304 has been displaced, the distance $D_1$ must be recalculated. To do so, the laser rangefinder 318 is aimed at a predetermined location on the remote module 302 and the distance read by the rangefinder 318 is supplied to the controller circuit 328.

The laser rangefinder 318 is then aimed at the target point 408 that is at the junction of the column 398 and the wall 394 (FIG. 24). The user actuates the key to start the data acquisition of the relative spacial coordinates of the target point 408. When the calculations are over, a dot 408a corresponding to the location of the target point 408 and a semi-circular line 410 joining dots 402a, 406a and 408a are displayed on the screen 324.

The data acquisition may be continued from this point by indicating that straight lines are to be drawn between the dots as illustrated in FIG. 25.

Returning to more general considerations, it is to be noted that the method used to reposition the remote module 302 is the same as in the U.S. Pat. No. 5,675,514, issued to the present applicant, which is hereby incorporated by reference. In short, before moving the remote module 302 from its original position, at least two target points are selected and their relative position is calculated. The remote module is then moved to its new position and the relative positions of the same target points are calculated. As will be apparent to one of ordinary skill in the art, with this information the controller circuit 48 may calculate the new position of the remote module 302. Another method would be to manually overlay the corresponding target points to reconstruct the entire floor plan from the floor plans of adjacent rooms.

The controller circuit 328 may includes a plurality electronic circuits (not shown) mounted to each module 302 and 304 and linked to the various elements (motors, laser sources, rotary encoders, laser rangefinders, etc.) of these modules. The controller circuit 328 may also include microcontrollers or any suitable circuits to enable the controller circuit 328 to perform the above mentioned calculations. For example, it has been found advantageous to use a personal computer running a suitable software to embody the data acquisition unit 322. As mentioned hereinabove, the personal computer used to embody the data acquisition unit 322 could advantageously be mounted to the module 304 for easy access by the operator taking measurements.

As will be apparent to one of ordinary skill in the art, the controller circuit 328 may include many override procedures to compensate for errors in the operation of the telemetric spacial data recorder 300.

It is also to be noted that if stepper motors are used to rotate the prism rotatable support assemblies 342, the rotary encoders 349 connected to the rotatable support assemblies 342 could be replaced by an electronic circuit (not shown) that would count the number of steps done by the stepper motor and translate this number of steps into an angle.

As will be understood by one of ordinary skill in the art, the laser rangefinder 318 could be replaced by other electronic distance measurement devices.

While the telemetric spacial data recorders 10 and 300 have been described herein as advantageous to devise floor plans, it is to be noted that these recorders could also be used to devise three-dimensional plans of rooms. Indeed, since it is possible to aim at target points that are not on the same height level than the modules while measuring what angle was necessary to reach these target points, if the height levels of the modules are known to the controller circuits, it is possible to calculate the relative three-dimensional spacial position of a target point with respect to a three-dimensional spacial reference point defined by one of the modules.

Although the present invention has been described hereinabove by way of preferred embodiments thereof, it can be modified, without departing from the spirit and nature of the subject invention as defined in the appended claims.

What is claimed is:

1. A telemetric spacial data recorder for devising a floor plan comprising:

a first stationary module defining a spacial reference point;

a second displaceable module;

first means for measuring a distance separating said second module from said first stationary module;

first means for measuring an angular spacial relation between said second module and said first stationary module; said first angular spacial relation measuring means including a rotative detecting element mounted to said first stationary module for detecting said second module; said rotative detecting element including a laser source configured to emit a generally fan-shaped laser beam; said first angular spacial relation measuring means also including means for measuring an angular position of said rotative detecting element;

a third movable module;

second means for measuring a distance separating said third module from said second module;

second means for measuring an angular spacial relation between said third module and said second module;

third means for measuring a distance separating said third module from a physical surface spacial point;

third means for measuring an angular spacial relation between said physical surface spacial point and said third movable module; and data acquisition unit including (a) means for collecting distance data from said first, second and third distance measuring means, (b) means for collecting angular relation data from said first, second and third angular spacial relation measuring means, and (c) means for calculating a relative spacial position of said physical surface spacial point with respect to said spacial reference point from said distance data and said angular relation data.

2. A telemetric spacial data recorder as defined in claim 1, wherein said first measuring means include an electronic distance measurement device.

3. A telemetric spacial data recorder as defined in claim 2, wherein said electronic distance measurement device includes a laser rangefinder mounted to one of said first stationary module and said second module; whereby said laser rangefinder measures the distance between said first stationary module and said second module and supplies the distance data to said data acquisition means.

4. A telemetric spacial data recorder as defined in claim 1, wherein said laser source of said rotative detecting element is mounted to an electric motor.

5. A telemetric spacial data recorder as defined in claim 1, wherein said second module includes a laser beam reflecting surface.

6. A telemetric spacial data recorder as defined in claim 5, wherein said first angular spacial relation measuring means further include a reflected laser beam sensor.

7. A telemetric spacial data recorder as defined in claim 1, wherein said angular position measuring means includes a rotary encoder connected to said rotative detecting element.

8. A telemetric spacial data recorder as defined in claim 7, wherein said electronic distance measurement device includes a laser rangefinder mounted to one of said second module and said third module; whereby said laser rangefinder measures the distance between said second module and said third module and supplies the distance data to said data acquisition means.

9. A telemetric spacial data recorder as defined in claim 1, wherein said second distance measuring means include an electronic distance measurement device.

10. A telemetric spacial data recorder as defined in claim 1, wherein said second angular spacial relation measuring means include:

a rotative detecting assembly mounted to said second module for detecting a portion of said third module;

means for measuring an angular position of said rotative detecting assembly; said angular position measuring means supplying angular data to said data acquisition means.

11. A telemetric spacial data recorder as defined in claim 10, wherein said detected portion of said third module is substantially coned-shaped.

12. A telemetric spacial data recorder as defined in claim 10, wherein said rotative detecting assembly includes:

a laser rangefinder fixedly mounted to said second module; said laser rangefinder emitting a laser beam;

a laser beam reflecting mechanism rotatably mounted to said second module for modifying a trajectory of said laser beam;

whereby, while said laser rangefinder is fixedly mounted to said second module, said trajectory of said laser beam emitted by said laser rangefinder may be modified by rotating said laser beam reflecting mechanism.

13. A telemetric spacial data recorder as defined in claim 12, wherein said laser beam reflecting mechanism includes:

an electric motor fixedly mounted to said second module; said electric motor having a rotatable longitudinal shaft;

laser beam reflecting means pivotally mounted to said rotatable shaft;

means for pivoting said reflecting means about an axis that is substantially perpendicular to said longitudinal shaft;

means for measuring a pivotement angle of said reflecting means about said axis.

14. A telemetric spacial data recorder as defined in claim 12, wherein said angular position measuring means includes a rotary encoder connected to said laser beam reflecting mechanism.

15. A telemetric spacial data recorder as defined in claim 1, wherein said third distance measuring means include an electronic distance measurement device.

16. A telemetric spacial data recorder as defined in claim 15, wherein said electronic distance measurement device includes a laser rangefinder mounted to said third module; whereby said laser rangefinder measures the distance between said third module and said physical surface spacial point, and supplies the distance data to said data acquisition means.

17. A telemetric spacial data recorder as defined in claim 1, wherein said third module includes a first fixed portion and a second portion pivotally mounted to said fixed portion through a pivot pin; said third module also including a rotary encoder connected to said pivot pin for measuring an angle between said fixed portion and said pivoting portion; said rotary encoder supplying angle data to said data acquisition means.

18. A telemetric spacial data recorder as defined in claim 17, wherein said pivoting portion includes:

a laser source assembly rotatively mounted to said pivoting portion; said laser source assembly emitting a laser beam;

means for measuring an angular position of said laser source assembly; said angular position measuring means supplying angular data to said data acquisition means;

laser beam sensing means mounted to said second module; said sensing means supplying sensing data to said data acquisition means.

19. A telemetric spacial data recorder as defined in claim 18, wherein said laser source assembly includes:

an electric motor fixedly mounted to said third module, said electric motor having a rotatable shaft; and a laser source fixedly mounted to said rotatable shaft; said laser source emitting a fan-shaped laser beam.

20. A telemetric spacial data recorder as defined in claim 19, wherein said angular position measuring means includes a rotary encoder connected to said rotatable shaft.

21. A telemetric spacial data recorder as defined in claim 1, wherein said first angular spacial relation measuring means include means for measuring a relative angular position of said second module with respect to said first module.

22. A telemetric spacial data recorder as defined in claim 1, wherein said second angular spacial relation measuring means include means for measuring a relative angular position of said third module with respect to said second module.

23. A telemetric spacial data recorder as defined in claim 1, wherein said third angular spacial relation measuring means include means for measuring a relative angular position of said physical surface spacial point with respect to said third module.

24. A telemetric spacial data recorder for devising a floor plan comprising:

a first displaceable module defining a spacial reference point;

a second movable module;

a distance measuring device mounted to one of said first and second modules; said distance measuring device being configured to selectively measure (i) a first distance separating said second movable module from said first displaceable module and (ii) a second distance separating said second movable module from a physical surface spacial point;

an angular spacial relation measuring device configured to measure an angular spacial relation between said second module and said first module and between said physical surface spacial point and said second movable module; and data acquisition means including (a) means for collecting distance data from said distance measuring device, (b) means for collecting angular relation data from said angular spacial relation measuring device, and (c) means for calculating a relative spacial position of said physical surface spacial point with respect to said spacial reference point from said distance data and said angular relation data.

25. A telemetric spacial data recorder as defined in claim 24, wherein said distance measuring device includes an electronic distance measuring device.

26. A telemetric spacial data recorder as defined in claim 25, wherein said electronic distance measuring device includes a laser rangefinder.

27. A telemetric spacial data recorder as defined in claim 24, wherein said distance measuring device is so mounted to said second module as to rotate about a generally vertical axis and to pivot about a generally horizontal axis; said recorder further including means for measuring the pivotement of said distance measuring means; said data acquisition means including means for collecting pivotement data from said pivotement measuring means.

28. A telemetric spacial data recorder as defined in claim 24, wherein said angular spacial relation measuring device includes:

a first angular relation measuring device provided with a cylindrical body mounted to said first module; said first angular relation measuring device includes a first laser source emitting a generally horizontal first laser beam, means to rotate said first laser beam about a first axis, a rotation driving element rotating said first laser source about said first axis, a first rotary encoder encoding the angular position of the first laser source about said first axis, and a plurality of first laser beam sensors mounted to said cylindrical body at predetermined positions; said first rotary encoder supplying angular position data to said data acquisition means; and a second angular relation measuring device provided with a cylindrical body mounted to said second module; said second angular relation measuring device includes a second laser source emitting a generally horizontal second laser beam, means to rotate said second laser beam about a second axis, a rotation driving element rotating said second laser source about said second axis, a second rotary encoder encoding the angular position of the second laser source about said second axis, and a plurality of second laser beam sensors mounted to said cylindrical body at predetermined positions; said second rotary encoder supplying angular position data to said data acquisition means;

whereby (a) when one of said plurality of second laser beam sensors detects said first laser beam, the angular position indicated by said first rotary encoder is transferred to said data acquisition means since it occurs when the rotation of the first laser beam directs the first laser beam towards said one of said plurality of second laser beam sensors, and (b) when one of said plurality of first laser beam sensors detects said second laser beam, the angular position indicated by said second rotary encoder is transferred to said data acquisition means since it occurs when the rotation of the second laser beam directs the second laser beam towards said one of said plurality of first laser beam sensors.

29. A telemetric spacial data recorder as defined in claim 28, wherein said first and second laser beams are generally fan-shaped.

30. A telemetric spacial data recorder for devising a floor plan comprising:

a first displaceable module defining a spacial reference point;

a second movable module;

a first distance measuring device mounted to one of said first and second modules; said first distance measuring device being configured to measure a first distance separating said second movable module from said first displaceable module;

a first angular spacial relation measuring device configured to measure an angular spacial relation between said second module and said first module; said first angular spacial relation measuring device including a rotative detecting assembly mounted to said first module for detecting a portion of said second module; said first angular spacial relation measuring device also including means for measuring an angular position of said rotative detecting assembly;

a second distance measuring device mounted to said second module; said second distance measuring device being configured to measure a second distance separating said second movable module from a physical surface spacial point;

a second angular spacial relation measuring device configured to measure an angular spacial relation between said physical surface spacial point and said second movable module; and data acquisition means including (a) means for collecting distance data from said first and second distance measuring devices, (b) means for collecting angular relation data from said first and second angular spacial relation measuring devices, and (c) means for calculating a relative spacial position of said physical surface spacial point with respect to said spacial reference point from said distance data and said angular relation data.

31. A telemetric spacial data recorder as defined in claim 30, wherein said detected portion of said second module is substantially coned-shaped.

32. A telemetric spacial data recorder as defined in claim 30, wherein said rotative detecting assembly includes:

a laser rangefinder fixedly mounted to said first module; said laser rangefinder emitting a laser beam;

a laser beam reflecting mechanism rotatably mounted to said first module for modifying a trajectory of said laser beam;

whereby, while said laser rangefinder is fixedly mounted to said first module, said trajectory of said laser beam emitted by said laser rangefinder may be modified by rotating said laser beam reflecting mechanism.

33. A telemetric spacial data recorder as defined in claim 32, wherein said laser beam reflecting mechanism includes:

an electric motor fixedly mounted to said first module; said electric motor having a rotatable longitudinal shaft;

laser beam reflecting means pivotally mounted to said rotatable shaft;

means for pivoting said reflecting means about an axis that is substantially perpendicular to said longitudinal shaft;

means for measuring a pivotement angle of said reflecting means about said axis.

34. A telemetric spacial data recorder as defined in claim 32, wherein said angular position measuring means includes a rotary encoder connected to said laser beam reflecting mechanism.

35. A telemetric spacial data recorder for devising a floor plan comprising:

a first displaceable module defining a spacial reference point;

a second movable module;

a first distance measuring device mounted to one of said first and second modules; said first distance measuring device being configured to measure a first distance separating said second movable module from said first displaceable module;

a first angular spacial relation measuring device configured to measure an angular spacial relation between said second module and said first module;

a second distance measuring device mounted to said second module; said second distance measuring device being configured to measure a second distance separating said second movable module from a physical surface spacial point;

a second angular spacial relation measuring device configured to measure an angular spacial relation between said physical surface spacial point and said second movable module; said second angular spacial relation measuring device including a laser source assembly so mounted to one of said first and second module as to be rotatable about a generally vertical rotation axis; said laser source assembly emitting a laser beam; said second angular spacial relation measuring device also including an angular position measuring device configured to measure an angular position of said laser source assembly and laser beam sensing means mounted to the other of said first and second modules; and data acquisition means including (a) means for collecting distance data from said first and second distance measuring devices, (b) means for collecting angular relation data from said first and second angular spacial relation measuring devices, and (c) means for calculating a relative spacial position of said physical surface spacial point with respect to said spacial reference point from said distance data and said angular relation data.

36. A telemetric spacial data recorder as defined in claim 35, wherein said laser source assembly includes:

an electric motor fixedly mounted to said second module, said electric motor having a rotatable shaft; and a laser source fixedly mounted to said rotatable shaft; said laser source emitting a generally fan-shaped laser beam.

37. A telemetric spacial data recorder as defined in claim 36, wherein said angular position measuring device includes a rotary encoder connected to said rotatable shaft.

* * * * *